(12) United States Patent
Sekino et al.

(10) Patent No.: US 9,308,833 B2
(45) Date of Patent: Apr. 12, 2016

(54) HARNESS WIRING APPARATUS

(75) Inventors: Tsukasa Sekino, Shizuoka (JP);
Tomoyasu Terada, Shizuoka (JP);
Shinji Katou, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 251 days.

(21) Appl. No.: 12/998,849

(22) PCT Filed: Oct. 7, 2009

(86) PCT No.: PCT/JP2009/067458
§ 371 (c)(1),
(2), (4) Date: Aug. 19, 2011

(87) PCT Pub. No.: WO2010/070970
PCT Pub. Date: Jun. 24, 2010

(65) Prior Publication Data
US 2012/0024564 A1    Feb. 2, 2012

(30) Foreign Application Priority Data

Dec. 16, 2008  (JP) .................................. 2008-319844
Apr. 15, 2009  (JP) .................................. 2009-099100

(51) Int. Cl.
*H02G 3/04* (2006.01)
*B60N 2/07* (2006.01)
(Continued)

(52) U.S. Cl.
CPC .............. *B60N 2/0705* (2013.01); *B60N 2/071* (2013.01); *B60N 2/0715* (2013.01); *B60R 16/027* (2013.01); *B60N 2002/0264* (2013.01)

(58) Field of Classification Search
CPC .. B60N 2/0705; B60N 2/0715; H02G 3/0468; H02G 3/383; H02G 3/0406; H02G 11/00

USPC ......... 174/68.1–68.3, 651, 656–658, 662, 69, 174/70 R, 71 R, 72 R, 72 A, 72 B, 72 C, 731.1, 174/74 R, 81–83, 84 R, 86, 87, 93, 70 B, 174/121 SR, 167, 168; 361/825, 826; 296/65.13, 65.01, 193.07

See application file for complete search history.

(56) References Cited

U.S. PATENT DOCUMENTS 6,267,630 B1    7/2001  Machado
6,494,523 B2 *  12/2002  Kobayashi ................... 296/155
(Continued)

FOREIGN PATENT DOCUMENTS

EP    1736368 A1    12/2006
FR    2790236 A1    9/2000
(Continued)

OTHER PUBLICATIONS

International Search Resort dated Nov. 17, 2009, issued for PCT/JP2009/067458.
(Continued)

*Primary Examiner* — Hoa C Nguyen
*Assistant Examiner* — Christopher L Augustin
(74) *Attorney, Agent, or Firm* — Locke Lord LLP

(57) ABSTRACT

A harness wiring apparatus wires a harness between a floor of a car and a seat, which is supported by a supporting member mounted at a long-tube-shaped support rail fixed at the floor. The harness wiring apparatus 1A includes a slider 10 holding the harness 4, which is led through an opening arranged at one end 7a in a direction of lengthwise of the support rail 7 into the support rail 7, and sliding interlockingly with the seat and the supporting member 11, and leading the harness 4 out of the support rail 7 through a slit 75 arranged at the support rail to the seat; and a receiving section 8 arranged in parallel to the support rail 7, and receiving an extra-length of the harness 4, which is led to an outside of the support rail 7 and folded to U-shape.

6 Claims, 19 Drawing Sheets

(51) Int. Cl.
*B60R 16/027* (2006.01)
*B60N 2/02* (2006.01)

(56) References Cited

U.S. PATENT DOCUMENTS

| | | | | |
|---|---|---|---|---|
| 6,861,589 | B2* | 3/2005 | Katsumata et al. | 174/68.3 |
| 7,042,738 | B2* | 5/2006 | Tsubaki | 361/826 |
| 7,238,029 | B2* | 7/2007 | Tsubaki | 439/34 |
| 7,268,296 | B2* | 9/2007 | Goto et al. | 174/72 A |
| 7,550,669 | B2* | 6/2009 | Rizzuto, Jr. | 174/68.1 |
| 7,552,962 | B2* | 6/2009 | Habering et al. | 296/155 |
| 7,729,132 | B2* | 6/2010 | Yamamoto et al. | 361/826 |
| 7,829,789 | B2* | 11/2010 | Yamaguchi | 174/72 A |
| 2005/0264033 | A1* | 12/2005 | Aoki et al. | 296/155 |
| 2006/0292923 | A1* | 12/2006 | Tsukamoto | 439/501 |
| 2008/0210828 | A1* | 9/2008 | Kogure et al. | 248/65 |
| 2009/0035953 | A1 | 2/2009 | Tsubaki | |

FOREIGN PATENT DOCUMENTS

| | | |
|---|---|---|
| JP | 2005-313662 A | 11/2005 |
| JP | 2006-042457 A | 2/2006 |
| JP | 2006-050841 A | 2/2006 |
| JP | 2008-220150 A | 9/2008 |

OTHER PUBLICATIONS

Office Action dated Jan. 28, 2013, issued for the Chinese patent application No. 200980146015.6 and English translation thereof.
Supplementary European Search Report dated Sep. 11, 2012, issued for the corresponding European Patent Application No. 09833275.2.

* cited by examiner

HARNESS WIRING APPARATUS

CROSS REFERENCE TO RELATED APPLICATIONS

This application is the national stage of International App. No. PCT/JP2009/067458, filed Oct. 7, 2009, which claims the right of priority under 35 U.S.C. §365(b) based on Japanese Patent Application Nos. 2008-319844 filed Dec. 16, 2008 and 2009-099100 filed Apr. 15, 2009, which is hereby incorporated by reference herein in its entirety as if fully set forth herein.

BACKGROUND OF THE INVENTION

1. Field of the Invention

This invention relates to a harness wiring apparatus for wiring a harness between a car body such as a floor of a car and a slide body such as a seat provided slidably against the car body.

2. Description of the Related Art

A car may include a floor of a car cabin as a car body and a seat as a sliding body slidable against the floor. An electronic device, for example, a seating sensor sensing seating of a passenger, is provided at the seat. A various harness wiring apparatus of wiring a harness between the floor and the seat is provided for connecting the electronic device at the seat and another electronic device fixed at the floor (refer Patent Document 1: Japan Patent Application No. 2006-42457).

The harness wiring apparatus according to the Patent Document 1 includes a support rail supporting slidably a supporting body for supporting a foot of the seat, a harness rail provided in parallel with the support rail, and a slider arranged slidably at the harness rail so as to slide corresponding to the seat. The support rail and the harness rail are arranged under a floor mat. The harness rail includes a slide-moving member, which the slider holding the harness is slidably attached at, and a harness receiving member receiving an extra-length of the harness. The slider projects to the car cabin through a slit provided at the mat so as to lead one end of the harness toward the seat arranged in the car cabin.

For the car provided with the harness wiring apparatus by prior art, not only a cutout for projecting the supporting body for supporting the foot of the seat, but also the slit for projecting the slider to the car cabin through the slit as mentioned above are required to be provide at the mat. Thus, it is a problem that many slits are required at the mat.

Corresponding to the problem, a harness wiring apparatus, which can reduce number of slits provided at a mat, is shown in Patent Document 2, Japan Patent Application No. 2005-313662. The harness wiring apparatus 100, as shown in FIG. 18, includes a support body 103 supporting a foot 102 of a seat 101, a support rail 104 arranging slidably the support body 103, and a winding device 106 winding and receiving an extra-length of a harness 105 in a housing 107.

One end 105a of the harness 105 led out from an outlet 107a of the housing 107 of the winding device 106 is inserted through the support rail 104, and through a guide pipe (not shown) provided in the support body 103, and pulled out of the support body 103 through a hole provided at the support body 103, and toward the foot 102. In FIG. 18, the mat is omitted, but the mat is provided with a slit for projecting the support body arranged at the support rail 104 therethrough to a passenger cabin.

As shown in FIG. 19, the winding device 106 includes the housing 107, a reel 132 and a spiral spring 133. The reel 132 is supported rotatably at a center of the housing 107. The other end 105b of the harness 105 is led and fixed at the center of the housing 107. Thus, the harness 105 is wound around the reel 132 winding in one direction, and unwound and pulled out from the reel 132 winding in the other direction. One end of the spiral spring 133 is fixed at the housing 107, and the other end of the spiral spring 133 is fixed at the reel 132. The spiral spring 133 is for generating an arguing force rotating the reel 132 in the one direction. Thereby, the harness 105 is wound by the arguing force of the spiral spring 133, and unwounded and pulled out against the arguing force, so that the harness 105 is held continuously in tension.

CITATION LIST

Patent Document 1: Japan Patent Appl. No. 2006-42457;
Patent Document 2: Japan Patent Appl. No. 2005-313662.

SUMMARY OF THE INVENTION

Objects to be Solved

The harness wiring apparatus 100 shown in FIGS. 18 and 19 requires the winding device 106 having such very complicated structure mentioned above. A side of the housing 107 of the winding device 106 cannot be reduced smaller than a diameter of a spirally-wound part of the harness 105. A thickness of the housing 107 is required so as to receive total thickness of stacking the reel 132 and the spiral spring 133. The harness wiring apparatus 100 further requires the guide pipe arranged in the support body 103, and the hole (large hole) at the support body 103, through which the one end 105a of the harness led from the guide pipe passes. Thus, it is problem that the very complicated structure of the support body 103 is required. Also, it is problem that operations of mounting the guide pipe at the support body 103 and passing the harness 105 through the guide pipe are not easy.

According to the above problems, an object of the present invention is to provide a harness wiring apparatus, which can reduces a number of slits arranged at a mat provided in a passenger's cabin of a car and has a simple structure.

How to Attain the Object of the Present Invention

In order to overcome the above problems and attain the object of the present invention, a harness wiring apparatus, which wires a harness between a car body and a slide body supported by a support body arranged slidably at a long-tube-shaped support rail fixed at the car body, includes a holding member holding the harness led through an opening provided at one end of the support rail into the support rail, and sliding interlockingly with the slide body and the support body, and leading the harness out of the support rail through a slit arranged between the one end of the support rail and the other end of the support rail toward the slide body; and a receiving section receiving an extra-length of the harness, which is led through the opening of the support rail to an outside of the support rail.

In the invention mentioned above, the receiving section receives the extra-length of the harness, which is folded in U-shape.

In the invention mentioned above, the harness wiring apparatus further includes a guide member guiding the extra-length of the harness, which is led through the opening of the support rail toward the outside of the support rail, to the receiving section.

In the invention mentioned above, the receiving section is arranged in parallel to the support rail.

In the invention mentioned above, the receiving section includes a parallel portion arranged in parallel to the support rail so as to receive the extra-length of the harness, which is led through the opening toward the outside of the support rail, and a connecting portion continuous to the parallel portion so as to guide the extra-length of the harness, which is led through the opening toward the outside of the support rail, to the parallel portion. The parallel portion and the connecting portion are made integrally of synthetic resin.

In the invention mentioned above, the receiving section is formed as a different component from the support rail.

In the invention mentioned above, the holding member includes a plurality of harness hold member holding the harness and arranges the harnesses in parallel to each other.

In the invention mentioned above, a slider arranged as the holding member is mounted at the support body and slidably against the support rail.

Effects of the Invention

According to the present invention, since the harness wiring apparatus includes the holding member holding the harness, which is led through the opening provided at one end of the support rail into the support rail, and sliding interlockingly with the slide body and the support body, and leading the harness out of the support rail through the slit arranged between the one end of the support rail and the other end of the support rail toward the slide body; and the receiving section receiving the extra-length of the harness, which is led through the opening of the support rail to the outside of the support rail, when the harness wiring apparatus is arranged under a mat of a car cabin, the harness can be led through a slit provided at the mat for passing the support body into the car cabin. Thereby, number of slits provided at the mat can be reduced. Another rail arranging the holding member slidably is not required. Thus, the harness wiring apparatus, which is a simple and small, and assembled easily, can be provided.

According to the present invention, the receiving section receives the extra-length of the harness, which is folded in U-shape. Thereby, a dimension along a widthwise direction of the receiving section can be reduced comparing with a dimension of a side of a housing by prior art, which receives a harness wound spirally. A lengthwise dimension of the receiving section can be smaller than a sliding range of the supporting body. Thus, the harness wiring apparatus can be structured simple and compact.

According to the present invention, the guide member guiding the extra-length of the harness, which is led through the opening of the support rail toward the outside of the support rail, to the receiving section is provided, so that damaging the harness led through the opening of the support rail, and bending the harness excessively, and rubbing the harness to each are prevented.

According to the present invention, the receiving section is arranged in parallel to the support rail, so that a dimension of the harness wiring apparatus along a widthwise of the support rail can be small.

According to the present invention, the receiving section includes the parallel portion arranged in parallel to the support rail so as to receive the extra-length of the harness, which is led through the opening to the outside of the support rail, and the connecting portion continuous to the parallel portion so as to guide the extra-length of the harness, which is led through the opening toward the outside of the support rail, to the parallel portion. Thereby, damaging the harness led from the opening of the support rail, and bending the harness excessively and rubbing the harness to each are prevented. The dimension of the harness wiring apparatus along the widthwise of the support rail can be small. The parallel portion and the connecting portion are made integrally of synthetic resin, so that number of components can be reduced and assembling process steps can be reduced.

According to the present invention, the receiving section is formed as the different component from the support rail, so that each stiffness of the support rails and receiving section can be increased. The receiving section can be arranged at a most suitable position in the car. In other words, the receiving section can be arranged more freely.

According to the present invention, the holding member includes the plurality of harness hold member holding the harness and arranges the harnesses in parallel to each other. Thereby, when number of wires of the harness is large, the harness wiring apparatus with a simple and compact structure can be provided.

According to the present invention, the slider arranged as the holding member is mounted at the support body and slidably against the support rail, so that the harness wiring apparatus with a more simple structure can be provided.

DESCRIPTION OF THE PREFERRED EMBODIMENT

First Embodiment

A harness wiring apparatus according to a first embodiment of the present invention will be described with reference to FIGS. 1-4.

Figure 3:
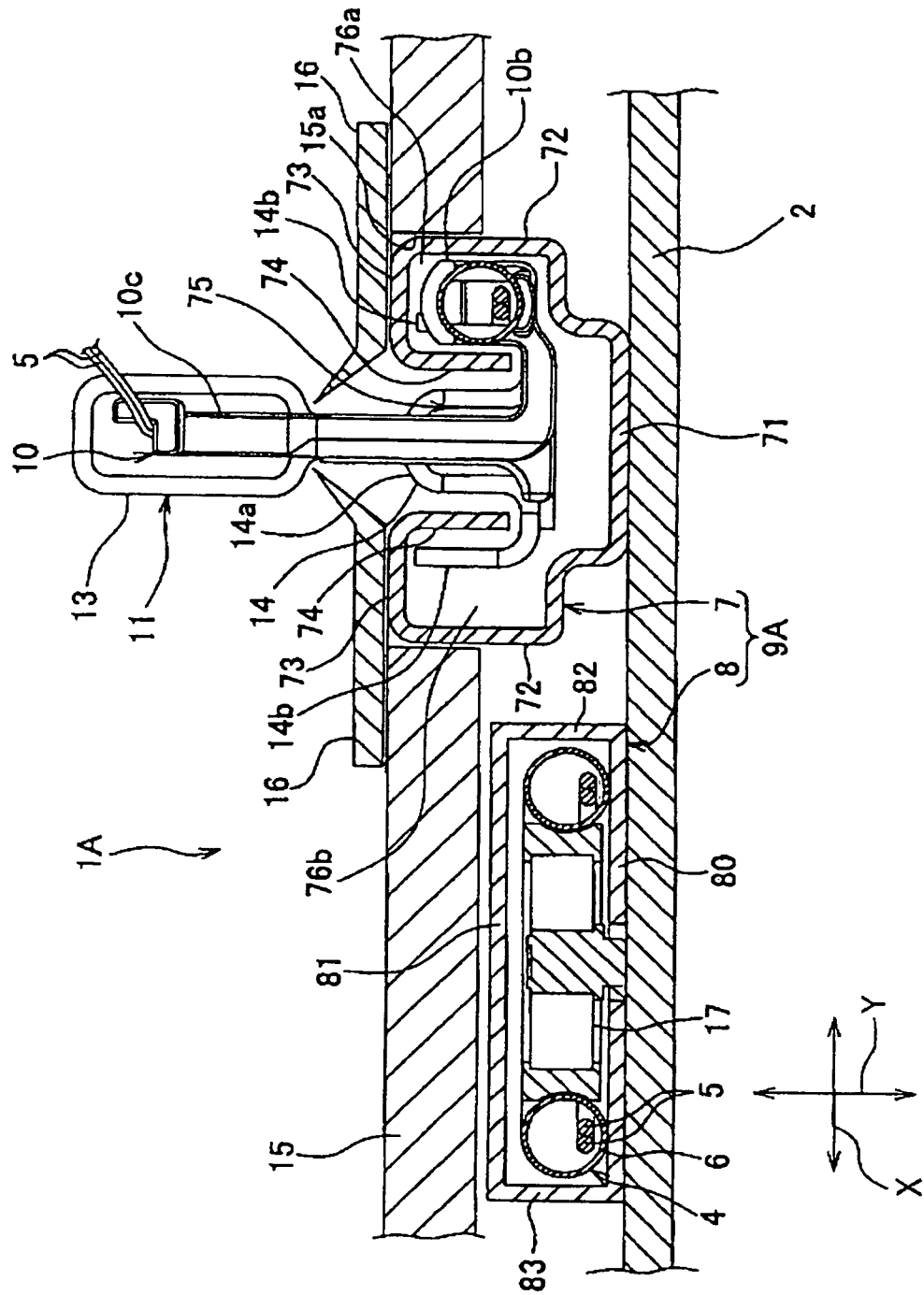
FIG. 3 is a cross-sectional view taken along the line A-A in FIG. 2.

The harness wiring apparatus 1A is an apparatus for wiring a harness 4 between a floor 2 (FIG. 3) of a car cabin as a car body of a car and a seat 3 (FIG. 1) as a slide body arranged slidably against the floor 2. A mat 15 is provided on the floor 2 (FIG. 3).

At the seat 3, an electronic device such as a seating sensor detecting seating of a passenger at the seat 3 and/or a seat-belt sensor detecting the passenger at the seat fastening the seat-belt is provided.

The harness 4 includes one wire or a plurality of wires 5 and a corrugate tube 6 receiving the wires 5. The wires 5, known covered wires, connect the electronic devices at the seat 3 and an electronic device such a ECU (Electronic Control Unit) arranged at the floor 2 as the car body. The corrugate tube 6 is made of synthetic resin such as polypropylene and formed with a bellows tube having small diameter root portions and large diameter threads alternatively for protecting the wires 5 by passing the wire therethrough.

The harness wiring apparatus 1A includes a rail 9A fixed at the floor 2 and arranged under the mat 15, a supporting body 11 supporting the seat 3, a pair of malls 16, a slider 10 as a holding member and a guide member 12A.

The rail 9A includes a long-tube-shaped support rail 7 arranging slidably the supporting body 11 supporting the seat 3 and a tube-shaped receiving section 8 extending along a lengthwise of the support rail 7 in parallel to the support rail 7 and receiving an extra-length of the harness 4 to be folded into U-shape. The support rail 7 and the receiving section 8 are separated different components. The supporting body 11 includes a seat mount portion 13 to be mounted to the seat 3 and a slide member 14 positioned in, the support rail 7 and sliding in the support rail 7.

An arrow Z in FIGS. 1-4 shows a lengthwise of sliding of seat 3, that is a lengthwise direction of support rail 7. In this embodiment, the direction shown with the arrow Z is in parallel to a direction of a front-rear direction of a car. An arrow X shows a widthwise direction of the support rail 7. In the embodiment, the direction shown with the arrow X is in parallel to a direction of a widthwise of the car. An arrow Y shows a vertical direction, that is a direction of a up-and-down direction of the car.

In the embodiment, the support rail 7 is formed by bending a metal sheet. The support rail 7 includes a bottom wall 71 arranged at the floor 2, a pair of side walls 72 extending from each of both ends of the bottom wall 71 along a widthwise direction (direction shown with the arrow X), a pair of top walls 73 extending from each top end of the side walls 72 so as to be closer to each other and opposing to the bottom wall 71, and a pair of inner walls 74 extending from each of ends far from the side walls 72 of the top walls 73. The pair of inner walls 74 has a space therebetween and a space between the bottom wall 71 and itself. A slit 75 is formed between the pair of inner walls 74, and opens toward the car cabin, that is seat 3. The slit 75 is arranged from one end 7a of the support rail 7 along a direction of a lengthwise of the support rail 7 to the other end 7b of the support rail 7. The support rail 7 has a long tube shape with a constant cross-section from the one end 7a to the other end 7b in the lengthwise direction (the direction shown with the arrow Z). An opening, through which the harness 4 is passed back and forth, is provided at the one end 7a of the support rail 7.

The slide member 14 of the supporting body 11 includes a central portion 14a positioned between the pair of inner walls 74, that is the slit 75, and a pair of extending portions 14b continuous to the central portion 14a and extending apart from each other (direction shown with the arrow X). The pair of extending portions 14b is positioned in each of a pair of rooms 76a, 76b apart from each other and surrounded with the bottom wall 71, the side walls 72, the top walls 73 and the inner walls of the support rails 71. The seat mount portion 13 is located above the central portion 14a, that is outside the support rail 7, and projects through a gap 15a arranged at the mat 15 (FIG. 3) to the car cabin.

The pair of rooms 76a, 76b and the slit 75 are displaced along the widthwise direction (direction shown with the arrow X) of the support rail 7.

In the present invention, since the pair of rooms 76a, 76b and the slit 75 are displaced to each other, it can be prevented that a foreign object penetrating from the slit 75 to the support rail 7 is stuffed in the pair of rooms 76a, 76b and obstructs motion of the supporting body.

One room 76a of the pair of rooms 76a, 76b, which is farther one apart from the receiving section 8, receives slidably the harness 4 and a harness mount portion 10b of the slider 10 mounting the harness 4. The harness 4 is led from one end 8a along the lengthwise direction (direction shown with the arrow Z) of the receiving section 8 out of the receiving section 8, and pulled through an opening provided at the one end 7a of the support rail 7 into one room 76a. The harness mount portion 10b mounts the harness 4 so as to clamp one end 6a of the corrugate tube 6 of the harness 4.

In the present invention, the room 76a and the slit 75 are displaced in the widthwise direction of the support rail 7, so that it can be prevented that a foreign object penetrating from the slit 75 to the support rail 7 touches the harness 4 and the harness mount portion 10b and the harness 4 and the harness mount portion 10b are damaged.

Figure 4:
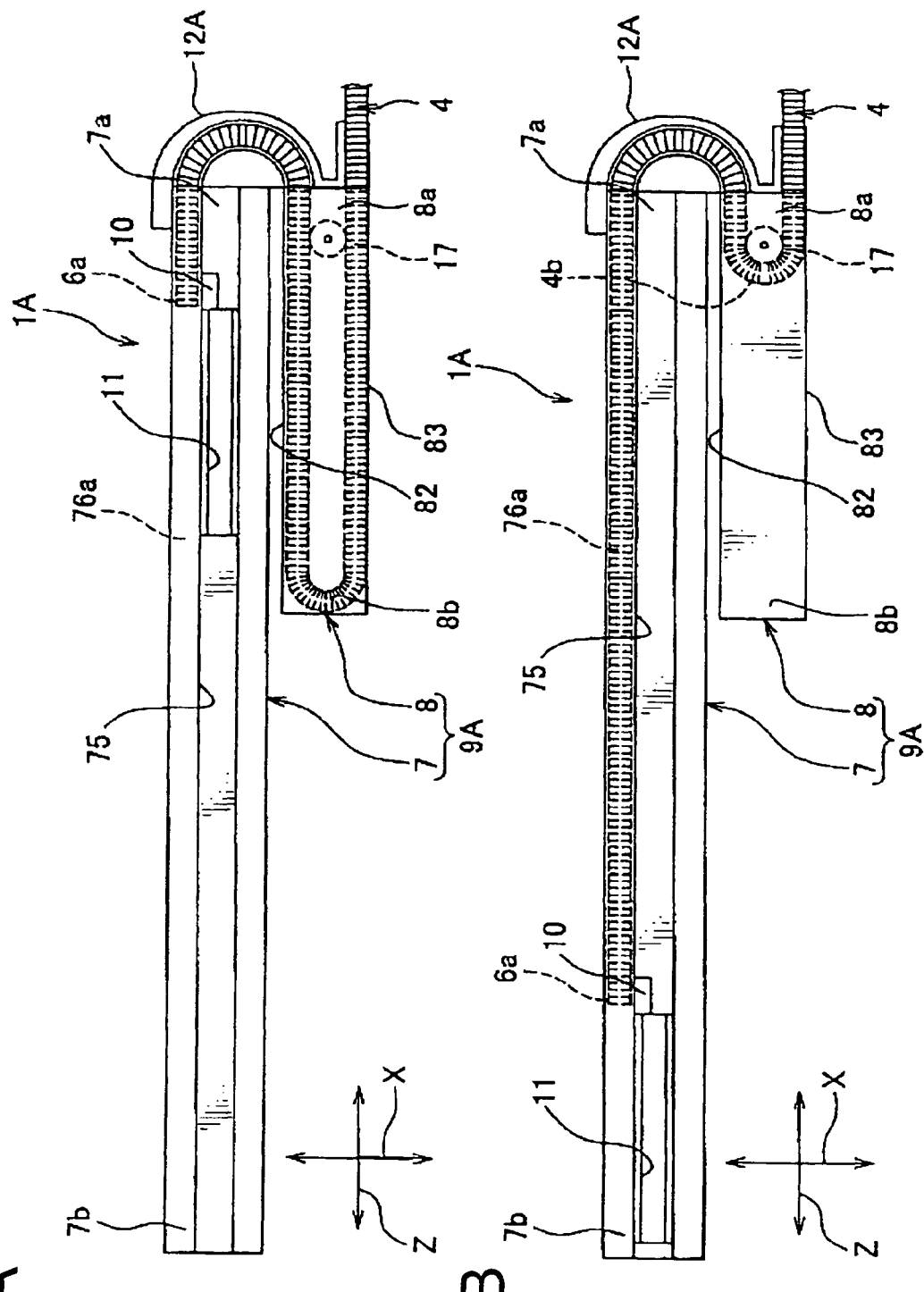
FIG. 4A is an illustration of a condition that a supporting body is positioned at one end of a support rail for explaining actions of the harness wiring apparatus shown in FIG. 1.
FIG. 4B is an illustration of a condition that the supporting body is positioned at the other end of the support rail for explaining actions of the harness wiring apparatus shown in FIG. 1.

The receiving section 8 in the embodiment is made of metal material. The receiving section 8 as shown in FIG. 3 is formed into a rectangular tube shape having a bottom wall 80 attached on the floor 2, a top wall 81 corresponding to the bottom wall 80 with a space therebetween, and a pair of side walls 82, 83 connecting the bottom wall 80 and the top wall 81. The receiving section 8 is formed with a constant cross-section from one end 8a to the other end 8b thereof along the lengthwise direction (direction shown with the arrow Z) of the receiving section 8. The receiving section 8 is aligned in parallel to the support rail 7. In other words, the receiving section 8 is arranged with a distance in the widthwise direction (direction shown with the arrow X) of the support rail 7. The one end 8a in the lengthwise direction of the receiving section 8 is provided to be adjacent to the one end 7a of the support rail 7. As shown in FIG. 4, the receiving section 8 receives an extra-length of the harness 4 to be folded to U-shape, which extra-length is led out of the support rail 7 from the opening of the one end 7a of the support rail 7.

Figure 2:
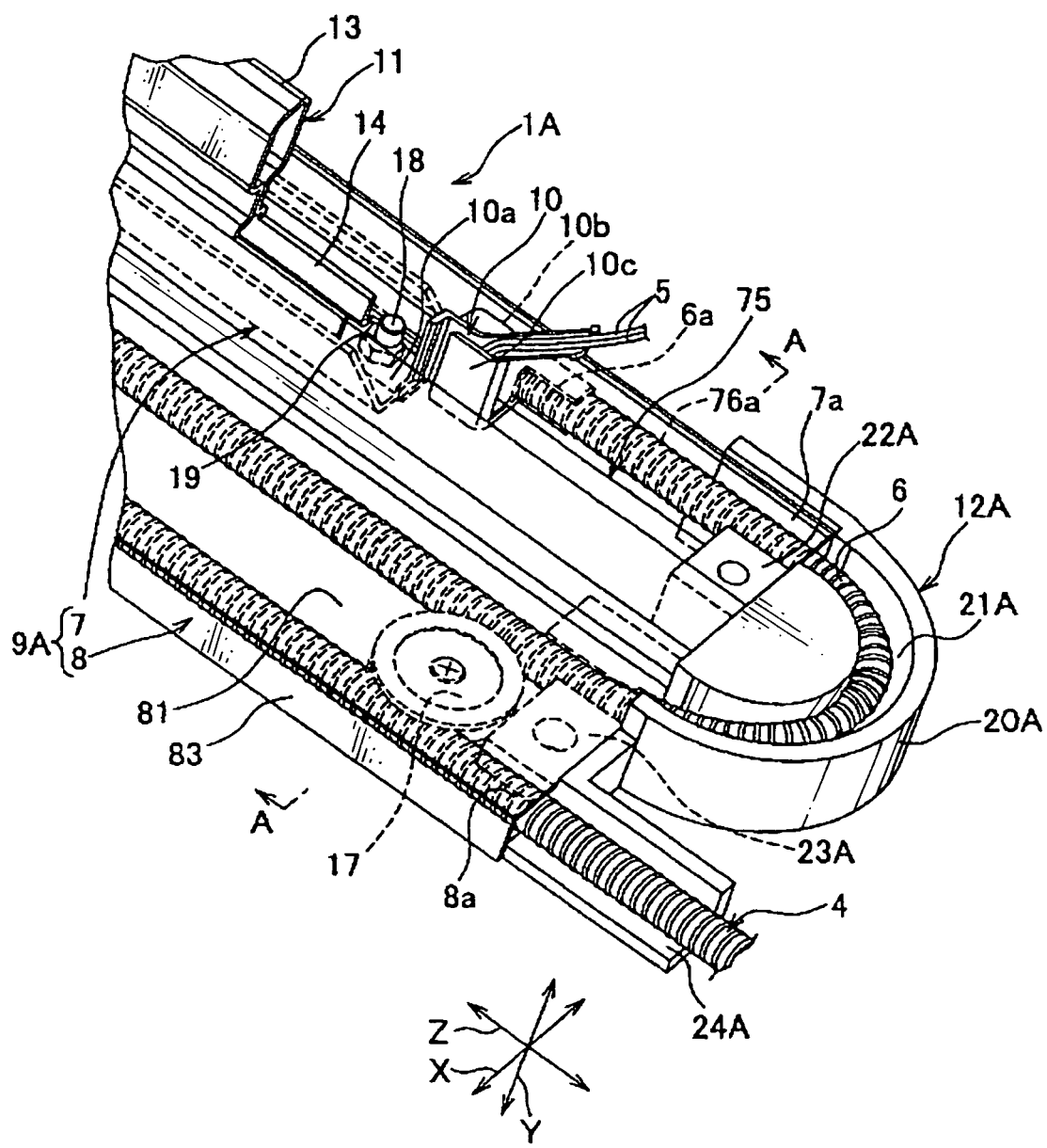
FIG. 2 is a partial expanded perspective view of the harness wiring apparatus shown in FIG. 1.

As shown in FIG. 2, a pulley 17 is provided in the one end 8a of the receiving section 8 so as to pull out/in the harness 4 smoothly therethrough and prevent the harness 4 from dropping out therefrom. The extra-length of the harness 4 led out from the opening of the one end 7a of the support rail 7 is pulled into the receiving section 8 through the one end 8a of the receiving section 8, and passed between the side wall 82 closer to the support rail 7 and the pulley 17 and folded into U-shape, and passed between the side wall 83 farther from the support rail 7 and the pulley 17, and pulled from the one end 8a of the receiving section 8 out of the receiving section 8. The pulley 17 is just example of the present invention, so that instead of the pulley 17, an un-rotatable guide member can be used.

In the present invention, since the receiving section 8 receives the harness 4 to be folded into U-shape, a dimension along the widthwise direction (direction shown with the arrow X) of the receiving section 8, that is a dimension in the widthwise direction of the rail 9A can be reduced smaller than a dimension of a side of the housing 107 by prior art which receives the harness 105 wound spirally. A dimension along the lengthwise direction (direction shown with the arrow Z) of the receiving section 8 can be reduced smaller than a sliding range, that is a dimension along the lengthwise direction (direction shown with the arrow Z) of the support rail 7. Thus, the harness wiring apparatus 1A can be structured simple and compact.

In the embodiment, the receiving section 8 is arranged as a separate part from the support rail 7. Thereby, stiffness of each of the support rail 7 and the receiving section 8 can be increased, and strength of the rail 9A can be also improved. Since the support rail 7 and the receiving section 8 are formed as a separated part with a constant cross-section along the lengthwise direction thereof, the support rail 7 and the receiving section 8 can be formed by a low cost manufacturing method, such as extruding or roll bending. Since the support rail 7 and the receiving section 8 are arranged separately, the support rail 7 and the receiving section 8, structuring together the rail 9A, can be placed at most suitable positions corresponding to a figure of the floor 2. Thus, the rail 9A can be arranged more freely. In the embodiment, the support rail 7 and the receiving section 8 are made of metal material. The present invention is not limited about that, the support rail 7 and the receiving section 8 can be made of synthetic resin. In other words, if the support rail 7 and the receiving section 8 can be held about deformation and damage when the support rail and the receiving section are stepped by a passenger, the support rail 7 and the receiving section 8 can be made of any material.

The pair of malls 16 (FIG. 3) is attached on an outer surface of the pair of top walls 73. The pair of malls 16 covers the slit 75 so as to prevent that a foreign body such as dust or dirt penetrates through the slit 75 into the support rail 7.

The slider 10 is made of synthetic resin. As shown in FIGS. 2 and 3, the slider 10 includes a connecting portion 10a attached at the supporting body 11, the harness mount portion 10b received slidably in the one of room 76a of the pair of rooms 76a, 76b of the support rail 7 and mounted to the harness 4, which the harness is led through the opening at the one end 7a of the support rail 7 into the room 76a, and an L-shaped lead portion 10c extending from the harness mount portion 10b and projecting through the slit 75 and the gap 15a of the mat 15 into the car cabin so as to pass the wires 5 of the harness 4 inside the lead portion 10c toward the seat 3. Thus, the slider 10 is mounted at the supporting body 11 so as to move slidably corresponding to the support rail 7. In other words, since the connecting portion 10a is mounted at the supporting body 11, the slider 10 can slide in the support rail 7 interlockingly with the supporting body 11 and the seat 3 by the sliding supporting body 11.

The connecting portion 10a formed into a plate shape with a hole in the center thereof. The connecting portion 10a is overlapped on a top end of a slide member 14 of the supporting body 11, and a bolt 18 is passed through the hole provided at the connecting portion 10a and a hole provided at the sliding member 14, and the bolt 18 is screwed with a nut 19. Thereby, the connecting portion 10a is fixed at the supporting body 11.

The harness mount portion 10b includes a pair of clamp plates corresponding to each other in the direction shown with the arrow Y, and clamping one end 6a of the corrugate tube 6 structuring the harness 4 therebetween, as shown in FIG. 2. Each of the pair of clamp plates includes a lock portion to be locked with each other. The harness mount portion 10b mounts the one end 6a of the corrugate tube 6, that is the harness 4, so as to align a center axis of the corrugate tube 6 in parallel to the sliding direction of the supporting body. Thus, the slider 10 holds the harness by the harness mount portion 10b.

The lead portion 10c passes the wires 5 therethrough, which the wires 5 are pulled out from the one end 6a of the corrugate tube 6 mounted at the harness mount portion 10b. The wires 5 are led from the slit 75 through an outside of the support rail 7 to the seat 3 arranged in the car cabin. The supporting body 11 and the lead portion 10c of the slider 10 pass through the gap 15a of the mat 15.

According to the present invention, the supporting body 11 is arranged slidably at the support rail 7, and the slider 10 is also arranged slidably at the support rail 7. Thereby, an additional rail only for arranging the slider slidably is not required, so that the harness wiring apparatus 1A can be structured compact and simple. Also, the usual supporting body 11 and the usual support rail 7 can be applied with a little modification. Furthermore, the slider 10 is arranged slidably at the support rail 7, at which the supporting body 11 is arranged slidably, so that the lead portion 10c of the slider 10, that is the harness 4, can pass through the gap 15a of the mat 15, through which the supporting body 11 passes. Thereby, number of the gaps 15a of the mat 15 can be reduced. According to the present invention, the slider 11 mentioned above is provided, so that the harness wiring apparatus 1A, which is structures compact and simple, and can be assembled easily, can be provided.

According to the present invention, the slider 10 is arranged at the supporting body 11 so as not to be contact with an inner surface of the support rail 7, as shown in FIG. 3. Thereby, without contact between the slider 10 and the support rail 7, the supporting body 11 and the slider 10 can move smoothly.

According to the present invention, the slider 10 holding a middle portion of the harness 4 slides interlockingly with the supporting body 11, so that when the slider 10 slides, the both ends of the wires 5 are not stressed, and it can be prevented that the both ends of the wires 5 are snapped.

The guide member 12A is made of synthetic resin, and as shown in FIG. 2, includes a main body 20A formed into a half cylinder shape; a guide 21A recessed from a top surface of the main body 20A, and guiding the extra-length of the harness 4, which is led through the opening at one end 7a of the support rail 7 to an outside of the support rail 7, that is an outside of room 76a, between a side wall 82 of the one end 8a of the receiving section 8 and the pulley 17; a first fixed portion 22A fixed at the one end 7a of the support rail 7; a second fixed portion 23A fixed at the one end 8a of the receiving section 8; and a lead out portion 24A arranged along the harness 4 wired from between the side wall 83 of the one end 8a of the receiving section 8 and the pulley 17 out to the receiving section 8 toward the floor 2. The guide 21A is a groove recessed from the top surface of the main body 20A, and formed into a half circle or U-shape in plan view. The harness 4 is formed into a U-shape to be folded by passing the guide 21A and guided in the receiving section 8.

According to the present invention, since the guide member 12A is provided, it can be prevented that the harness 4 led through the opening of the one end 7a of the support rail 7 is damaged or over bent, and the harness 4 is scratched with itself.

According to the present invention, the support rail 7 and the receiving section 8 are provided as a separated part, and the guide member 12A connects between the one end 7a of the support rail 7 and the one end 8a of the receiving section 8, the rail 9A and the guide member 12A can be arranged at the most suitable location corresponding to the figure of the floor 2. Thus, the rail 9A can be arranged more freely.

Actions of the harness wiring apparatus 1A structured above will be described with reference to FIG. 4. When the supporting body 11, that is the seat 3, is positioned at the one end 7a of the support rail 7 as shown in FIG. 4A, the extra-length of the harness 4 is received in the receiving section 8. As shown in FIG. 4B, while the supporting body 11, that is the seat 3, is sliding from the one end 7a toward the other end 7b of the support rail 7, the slider 10 is sliding from the one end 7a toward the other end 7b of the support rail 7 interlockingly with the supporting body 11, and the harness 4 is pulled out from the one end 8a of the receiving section 8 and into the opening of the one end 7a of the support rail 7.

Second Embodiment

Figure 5:
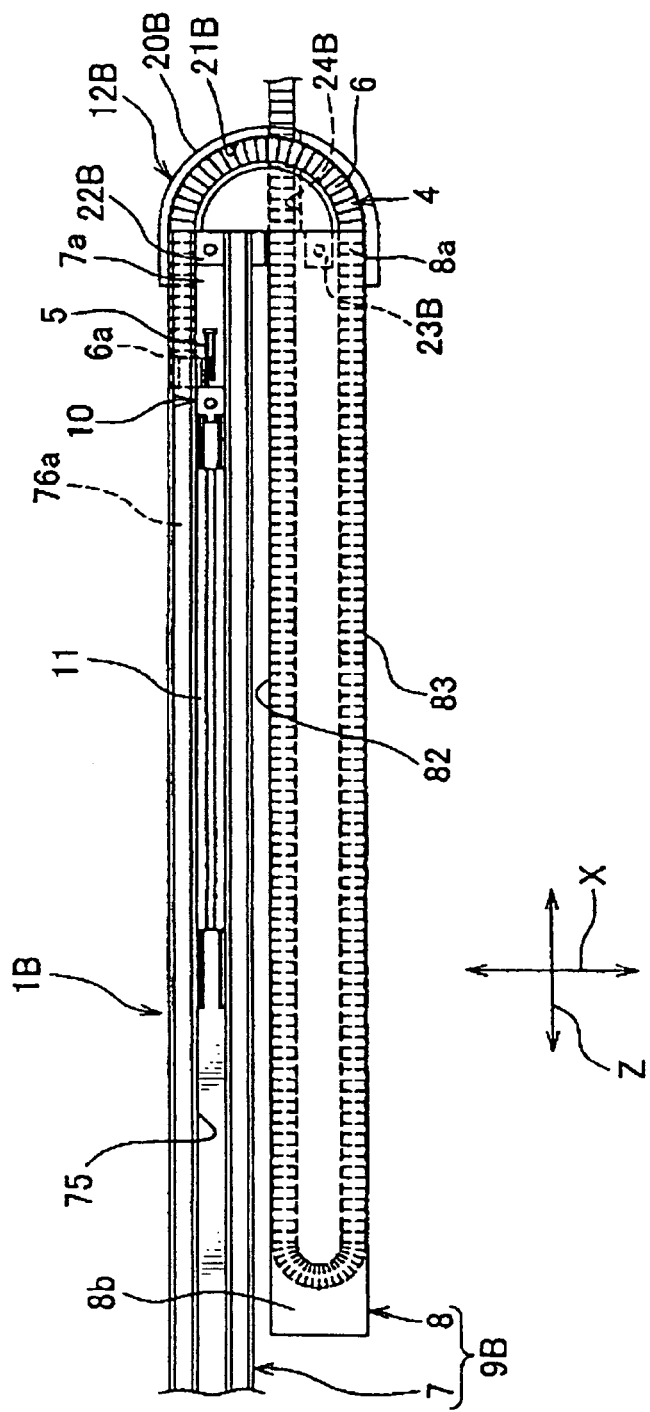
FIG. 5 is a plan view of a harness wiring apparatus of a second embodiment according to the present invention.

A harness wiring apparatus of a second embodiment according to the present invention is described with reference to FIG. 5. The same component as the first embodiment is indicated with the same mark and the description is omitted.

The harness wiring apparatus 1B according to the second embodiment includes a rail 9B having the support rail 7 and the receiving section 8 arranged in parallel to the support rail 7; the supporting body 11; the pair of mall 16 (not shown in FIG. 5); the slider 10 as the holding member; and a guide member 12B. The rail 9B includes the support rail 7 and the receiving section 8 as separated parts.

The guide member 12B is made of synthetic resin and includes a main body 20B formed into a half cylinder shape; a guide 21B recessed from a top surface of the main body 20B, and guiding the extra-length of the harness 4, which is led through the opening at one end 7a of the support rail 7 to the outside of the support rail 7, by bending into a U-shape toward the one end 8a of the receiving section 8 so as to touch the corrugate tube 6 to the inner wall of the side wall 83 of the receiving section 8 farther from the support rail 7; a first fixed portion 22B fixed at the one end 7a of the support rail 7; a second fixed portion 23B fixed at the one end 8a of the receiving section 8; and a second guide 24B arranging the corrugate tube 6 of the harness 4, which corrugate tube 6 is guided by the guide 21B and pulled into the receiving section 8 and folded to be U-shape in the receiving section 8, to be crossed over the guide 21B and itself so as to lead the corrugate tube 6 out of the receiving section 8.

The corrugate tube 6 of the harness 4, which corrugate tube is guided by the guide 21B and pulled into the receiving section 8, is folded to be U-shape in the receiving section 8, and a folded part of the corrugate tube 6 touches the inner surface 82 of the receiving section 8, closer to the support rail 7, by an elastic restoring force of the corrugate tube 6. The corrugate tube 6 is bent two times in one direction, so that by the elastic restoring force generated at the corrugate tube, the corrugate tube is expanded so as to touch inner surfaces of the side walls 82, 83.

According to the present invention, the corrugate tube 6 of the harness 4, which is pulled out from the support rail 7, is bent into the U-shape, and the guide member 12B includes the guide 21B guiding to touch the corrugate tube 6 to the inner surface 83 of the receiving section 8 farther from the support rail 7, and the corrugate tube 6 of the harness 4 is bent more into U-shape in the receiving section 8 in the same direction, in which the corrugate tube 6 is bent by the guide 21B. Thereby, the corrugate tube 6, that is the harness 4, is expanded in the receiving section 8 to touch the inner surfaces of the side walls 82, 83. Therefore, even if a guide member (FIG. 2) such, as the pulley 17 is not provided in the receiving section 8, the harness 4 is not scratched with itself when the corrugate tube 6 of the harness 5 is pulled in/out the receiving section 8, and the harness 4 can be moved smoothly. Thus, the receiving section can be formed into a simple tube shape, and the harness wiring apparatus 1B can be structured compact and simple. In the present invention, "bending in the same direction" means "bending at plural positions and totally in spiral".

According to the present invention, the corrugate tube 6 of the harness 4, which is led from the support rail 7, is guided by the guide 21B to touch the inner surface 83 of the receiving section 8 further from the support rail 7. The corrugate tube 6 of the harness 4 is wired with a large radius, so that the harness 4 can move smoothly. The corrugate tube 6 of the harness can be prevented from permanent deformation with small radius. The corrugate tube 6 of the harness 4 is bent more into U-shape in the receiving section 8 in the same direction, in which the corrugate tube 6 is bent by the guide 21B, so that the corrugate tube 6 of the harness 4 can be prevented from permanent deformation with a S-shape.

According to the present invention, the guide member 12B includes the second guide 24B leading the corrugate tube 6 folded to be U-shape in the receiving section 8, to be crossed over the guide 21B and itself. Thereby, when the harness is pulled in/out the receiving section 8, it is prevented that the corrugate tube 6 of the harness 4 is scratched at a cross point with itself.

Third Embodiment

Figure 6:
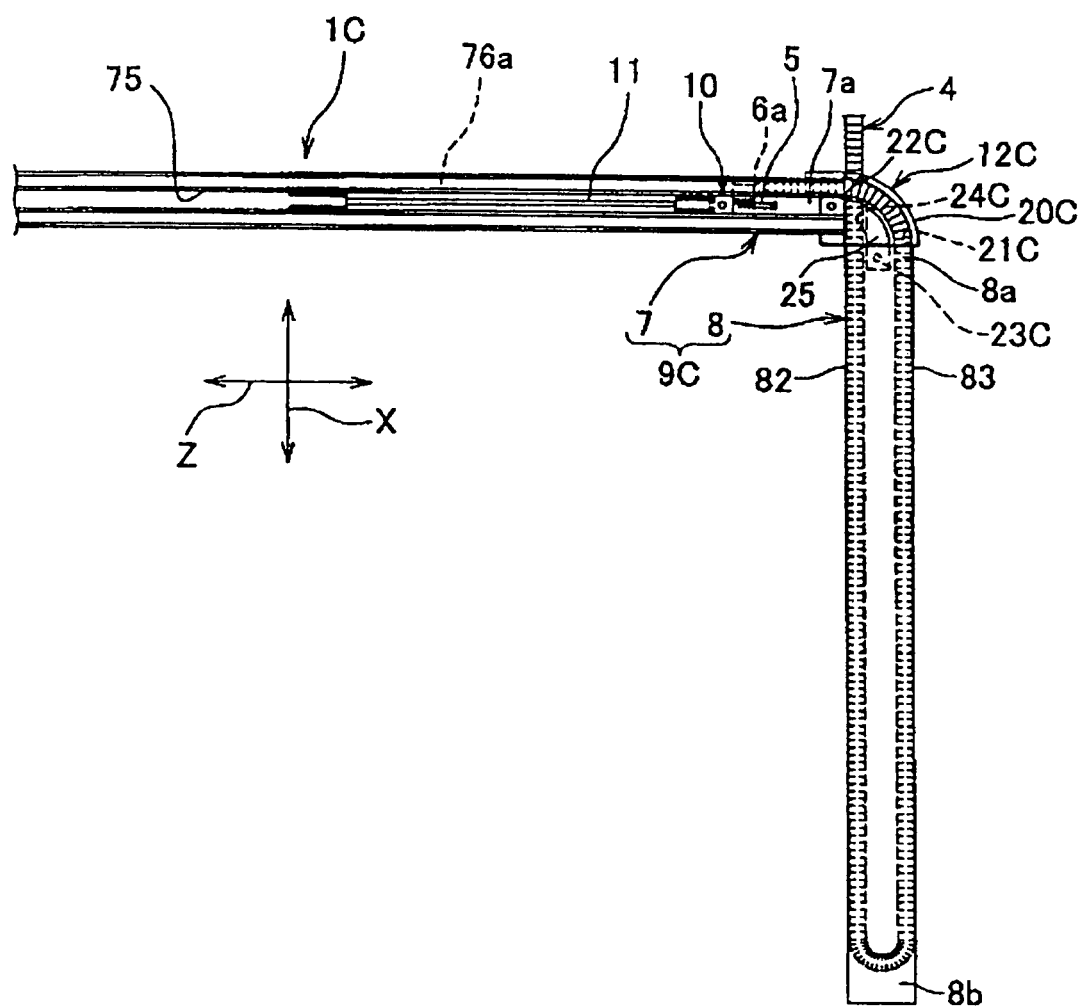
FIG. 6 is a plan view of a harness wiring apparatus of a third embodiment according to the present invention.
Figure 7:
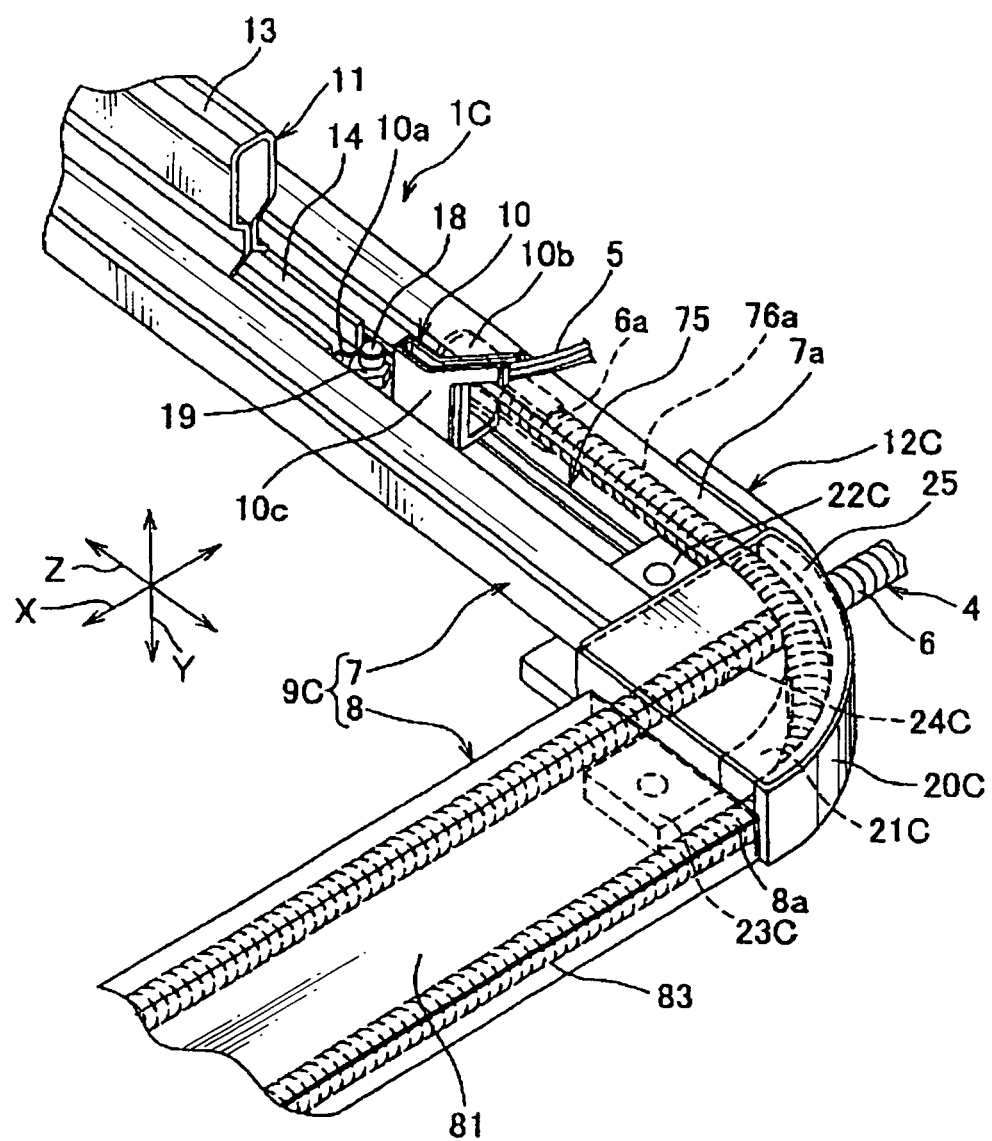
FIG. 7 is a partial expanded perspective view of the harness wiring apparatus shown in FIG. 6.

A harness wiring apparatus of a third embodiment according to the present invention is described with reference to FIGS. 6 and 7. The same component as the first and second embodiments is indicated with the same mark and the description is omitted.

The harness wiring apparatus 1C according to the embodiment includes a rail 9C having the support rail 7 and the receiving section 8; the supporting body 11; the pair of malls 16 (not shown in FIGS. 6-7); the slider 10 as the holding member; a guide member 12C; and a cover 25 mounted at a top of the guide member 12C.

The rail 9C includes the support rail 7 and the receiving section 8 as separated parts. The one end 8a of the receiving section 8 is located in the vicinity of the one end 7a of the support rail 7. The lengthwise of the receiving section 8 is aligned along a direction of the widthwise of the support rail 7 (direction shown with the arrow X). Thus, the rail 9C is formed totally into a L-shape by the support rail 7 and the receiving section 8.

The guide member 12C is made of synthetic resin, and includes a main body 20C; a guide 21B recessed from a top surface of the main body 20C, and guiding the harness 4, which is led out through the opening at one end 7a of the support rail 7, by bending toward the one end 8a of the receiving section 8 so as to touch the harness 4 to an inner wall of the side wall 83 of the receiving section 8 farther from the support rail 7; a first fixed portion 22C fixed at the one end 7a of the support rail 7; a second fixed portion 23C fixed at the one end 8a of the receiving section 8; and a second guide 24C leading the harness 4, which is guided by the guide 21C and pulled into the receiving section 8 and folded to be U-shape in the receiving section 8, to be crossed over the guide 21C and itself out of the receiving section 8. The harness 4, which is guided by the guide 21C and pulled into the receiving section 8, is folded into U-shape and the folded portion of the harness 4 is pushed to the inner surface of the side wall 82 of the receiving section 8 closer to the support rail 7 by an elastic restoring force of the corrugate tube 6.

According to the present invention, since the support rail 7 and the receiving section 8 are provided as a separated part and connected by guide member 12C between the one end 7a of the support rail 7 and the one end 8a of the receiving section 8, the rail 9C and the guide member 12C can be arranged most suitable positions corresponding to the figure of the floor 2. Thus, the rail 9C can be arranged more freely.

According to the present invention, since the cover 25 is arranged at the top of the guide member 12C, the harness 4 received in the guide 21C can be prevented from falling out of the guide 21C.

Fourth Embodiment

Figure 8:
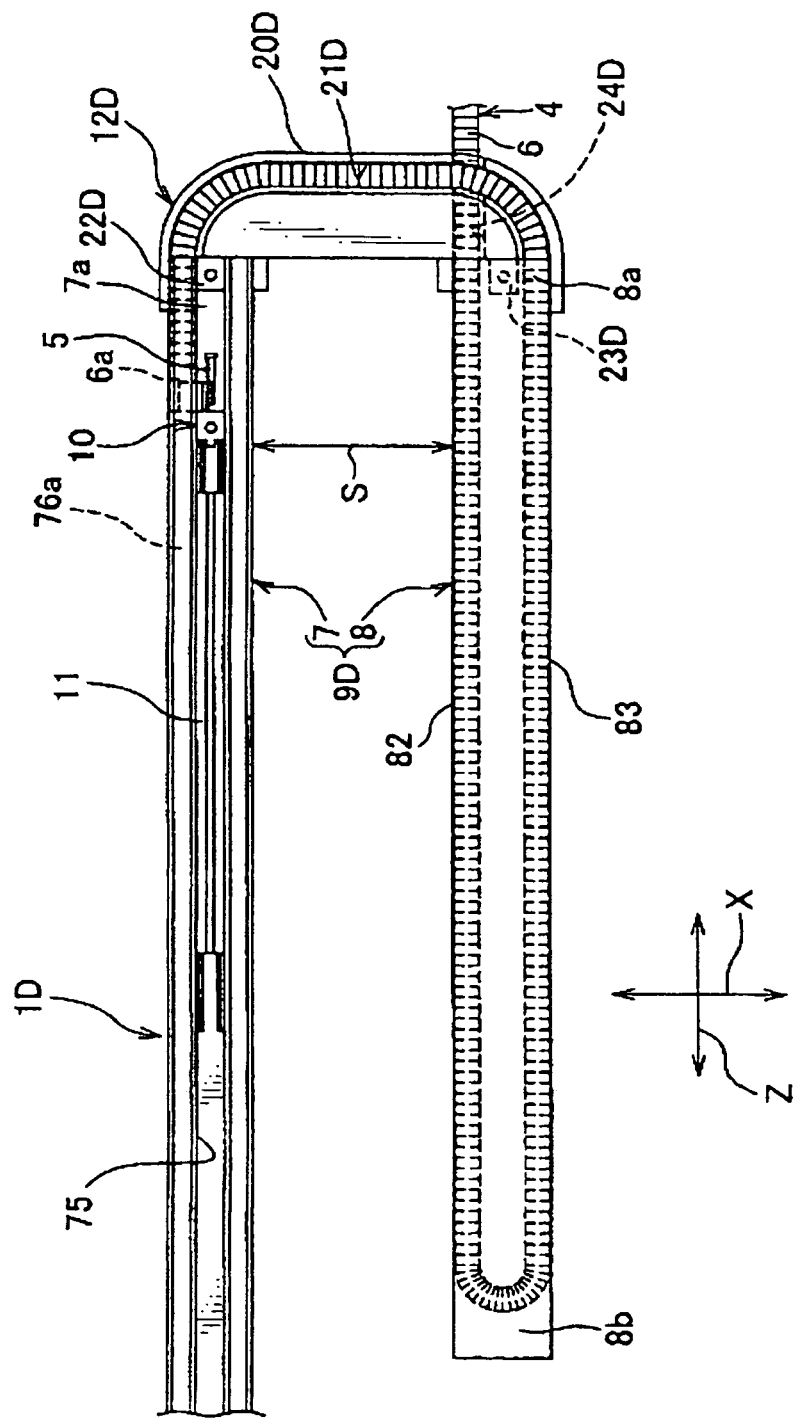
FIG. 8 is a plan view of a harness wiring apparatus of a fourth embodiment according to the present invention.

A harness wiring apparatus of a fourth embodiment according to the present invention will be described with reference to FIG. 8. The same component as the first, second and third embodiments is indicated with the same mark and the description is omitted.

The harness wiring apparatus 1D according to the embodiment includes a rail 9D having the support rail 7 and the receiving section 8 arranged in parallel to the support rail 7; the supporting body 11; the pair of malls 16 (not shown in FIG. 8); the slider 10 as the holding member; and a guide member 12D.

The rail 9D includes the support rail 7 and the receiving section 8 as separated parts. The support rail 7 and the receiving section 8 are arranged with a predetermined space S therebetween.

The guide member 12D is made of synthetic resin and includes a main body 20D; a guide 21D recessed from a top surface of the main body 20D, and guiding the harness 4, which is led through the opening at one end 7a of the support rail 7, by bending into a U-shape toward the one end 8a of the receiving section 8 so as to touch the harness 4 to the inner wall of the side wall 83 of the receiving section 8 farther from the support rail 7; a first fixed portion 22D fixed at the one end 7a of the support rail 7; a second fixed portion 23D fixed at the one end 8a of the receiving section 8; and a second guide 24D arranging the harness 4, which is guided by the guide 21D and pulled into the receiving section 8 and folded to be U-shape in the receiving section 8, to be crossed over the guide 21B and itself so as to lead the harness 4 out of the receiving section 8. The harness 4, which is guided by the guide 21D and pulled into the receiving section 8, is folded into U-shape in the receiving section 8 and the folded portion of the harness 4 is pushed to the inner surface of the side wall 82 of the receiving section 8 closer to the support rail 7 by an elastic restoring force of the corrugate tube 6.

Fifth Embodiment

Figure 9:
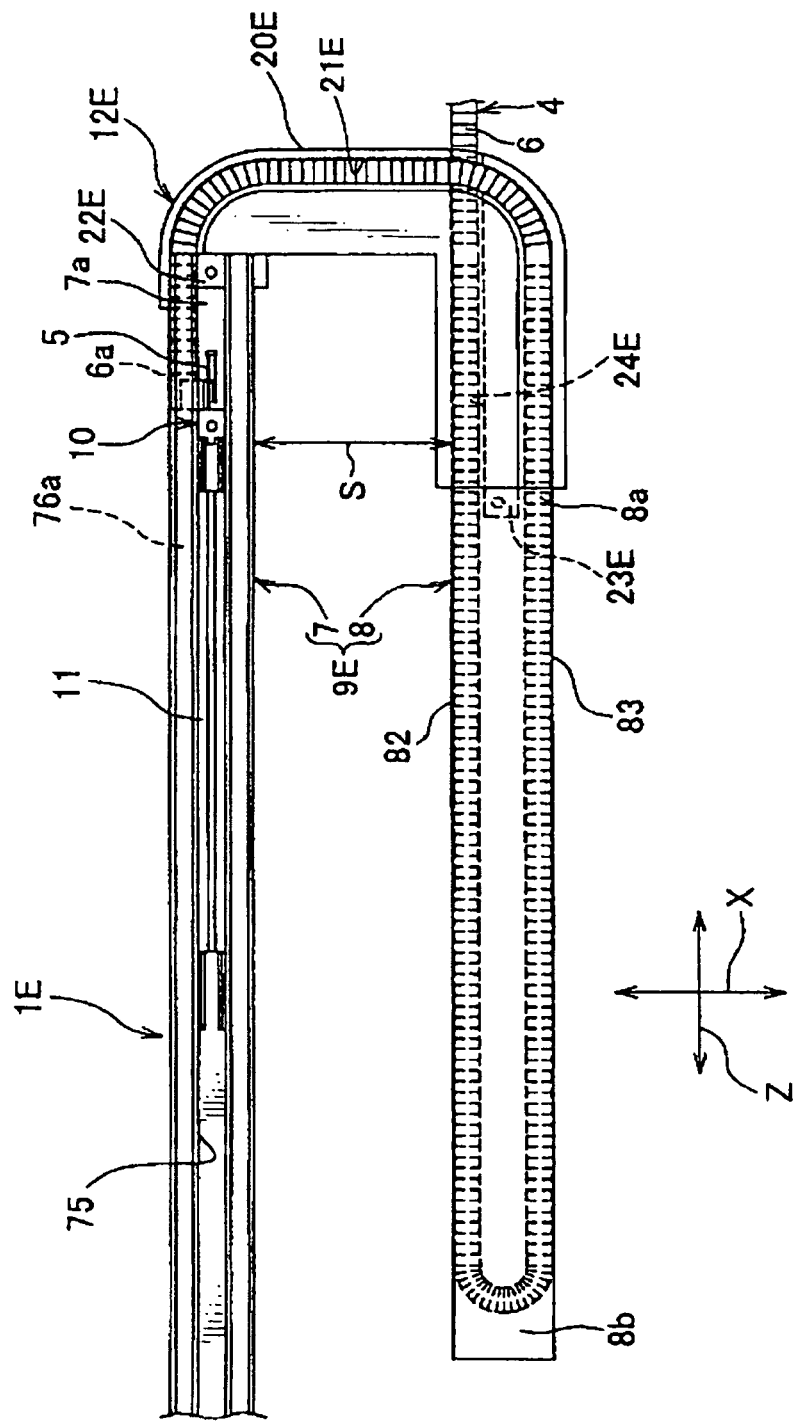
FIG. 9 is a plan view of a harness wiring apparatus of a fifth embodiment according to the present invention.

A harness wiring apparatus of a fifth embodiment according to the present invention will be described with reference to FIG. 9. The same component as the 1st-4th embodiments is indicated with the same mark and the description is omitted.

The harness wiring apparatus 1E according to the embodiment includes a rail 9E having the support rail 7 and the receiving section 8 arranged in parallel to the support rail 7; the supporting body 11; the pair of malls 16 (not shown in FIG. 9); the slider 10 as the holding member; and a guide member 12E.

The rail 9E includes the support rail 7 and the receiving section 8 as separated parts. The support rail 7 and the receiving section 8 are arranged with a predetermined space S therebetween. The one end 7a of the support rail 7 and the one end 8a of the receiving section 8 are displaced to each other along the direction of the lengthwise of the support rail 7 (direction shown with the arrow Z).

The guide member 12E is made of synthetic resin and includes a main body 20E formed into an L-shape in plan view; a guide 21E recessed from a top surface of the main body 20E, and guiding the harness 4, which is led through the opening at one end 7a of the support rail 7, by bending into a U-shape toward the one end 8a of the receiving section 8 so as to touch the harness 4 to the inner wall of the side wall 83 of the receiving section 8 farther from the support rail 7; a first fixed portion 22E fixed at the one end 7a of the support rail 7; a second fixed portion 23E fixed at the one end 8a of the receiving section 8; and a second guide 24E arranging the harness 4, which is guided by the guide 21E and pulled into the receiving section 8 and folded to be U-shape in the receiving section 8, to be crossed over the guide 21B and itself so as to lead the harness 4 out of the receiving section 8. The harness 4, which is guided by the guide 21E and pulled into the receiving section 8, is folded into U-shape in the receiving section 8 and the folded portion of the harness 4 is pushed to the inner surface of the side wall 82 of the receiving section 8 closer to the support rail 7 by an elastic restoring force of the corrugate tube 6.

An area of the floor 2 (FIG. 3), which toughs with a bottom surface of the main body 20E, is provided with a protruding portion. Therefore, the bottom surface of the main body 20E is formed corresponding to the protruding portion.

According to the present invention, when the floor 2 has a protruding portion, the guide member 12E formed corresponding the protruding portion of the area of the floor 2 can be arranged on the area of the floor, so that a bottom surface of the rail 9E is not required to be processed by complicated manufacturing methods. The guide member 12E may be made of synthetic resin so that the guide member 12E can be formed corresponding to the protruding portion of the floor 2 easily and costly by injection molding.

Sixth Embodiment

Figure 10:
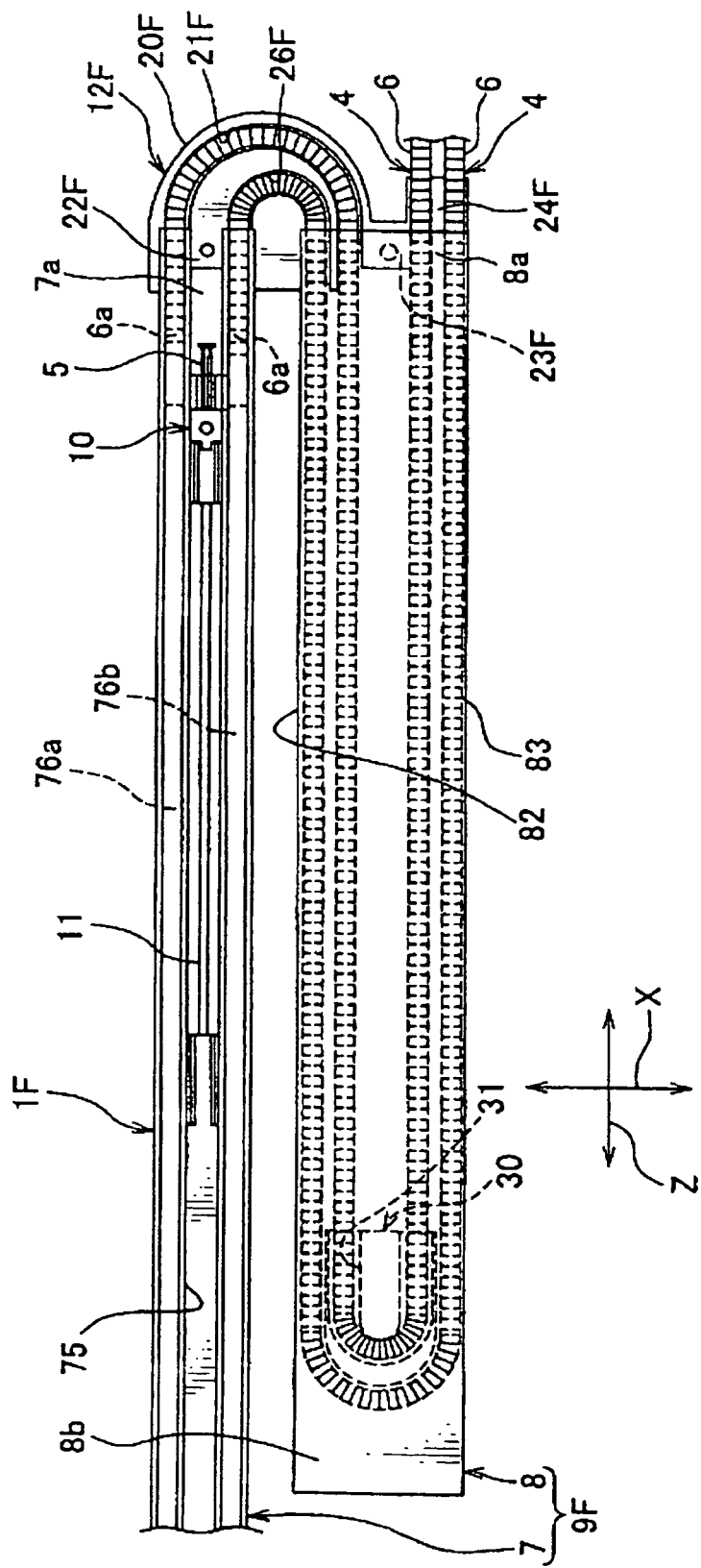
FIG. 10 is a plan view of a harness wiring apparatus of a sixth embodiment according to the present invention.
Figure 11:
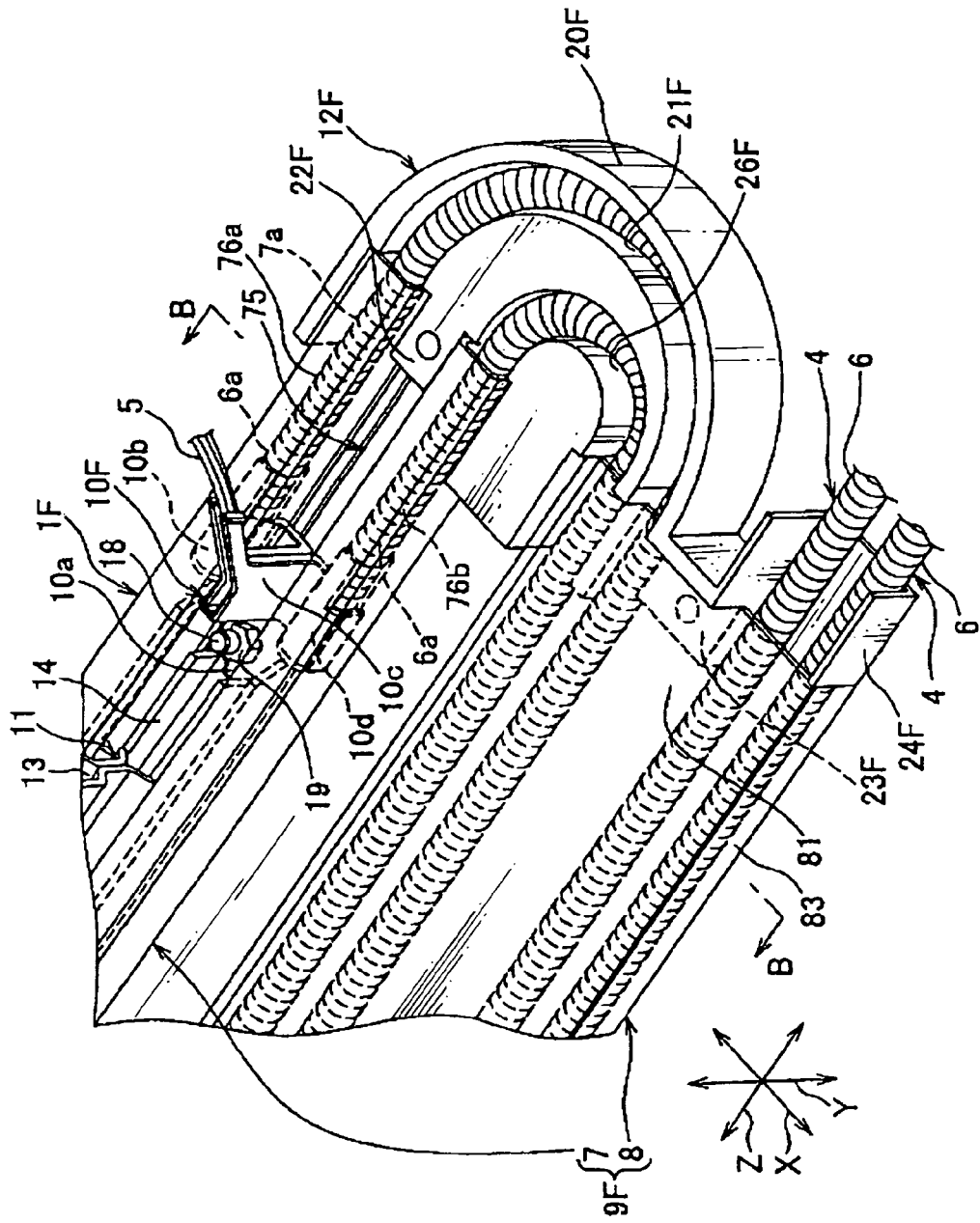
FIG. 11 is a partially expanded view of the harness wiring apparatus shown in FIG. 10.
Figure 12:
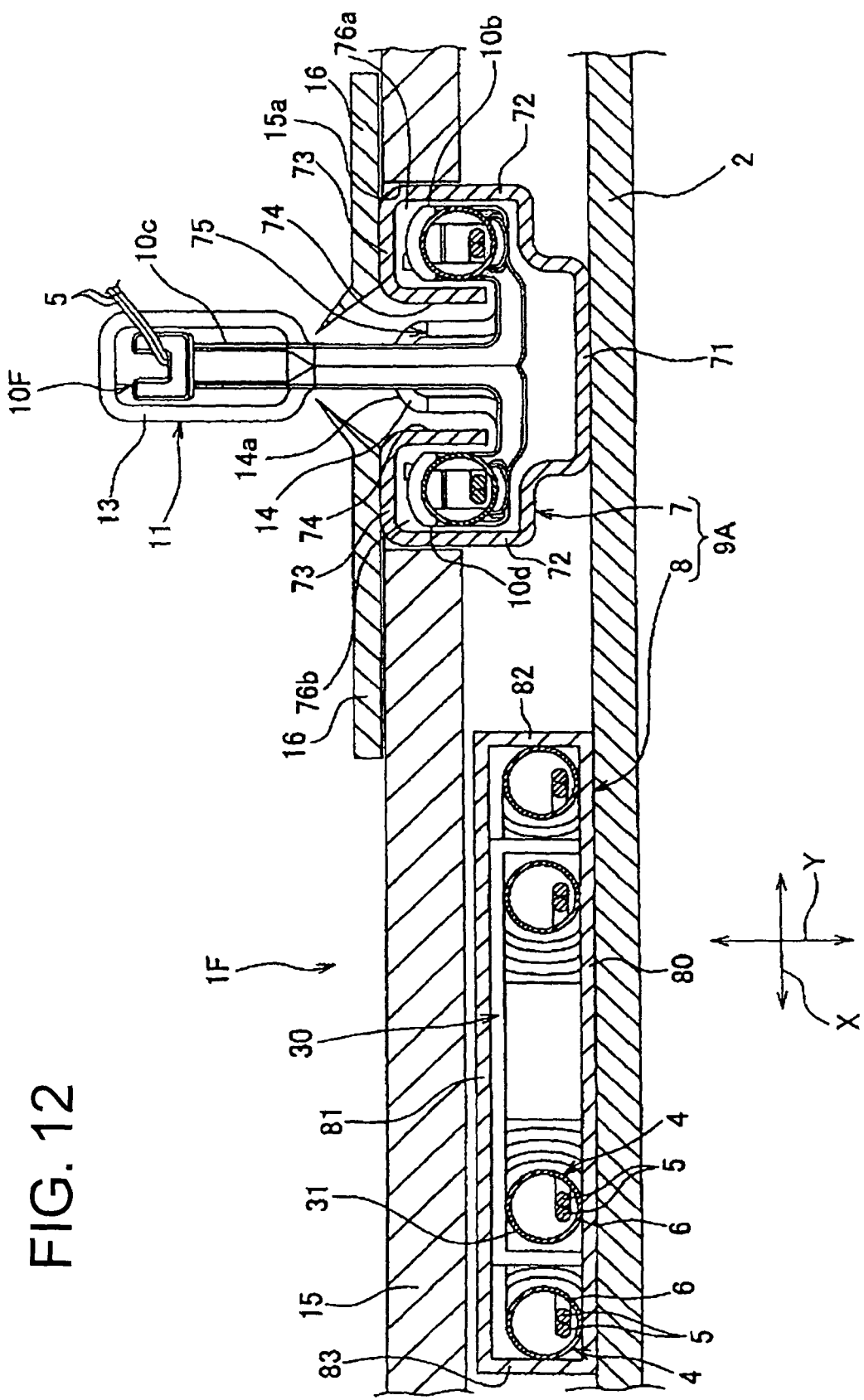
FIG. 12 is a cross-sectional view taken along the line B-B in FIG. 11.
Figure 13:
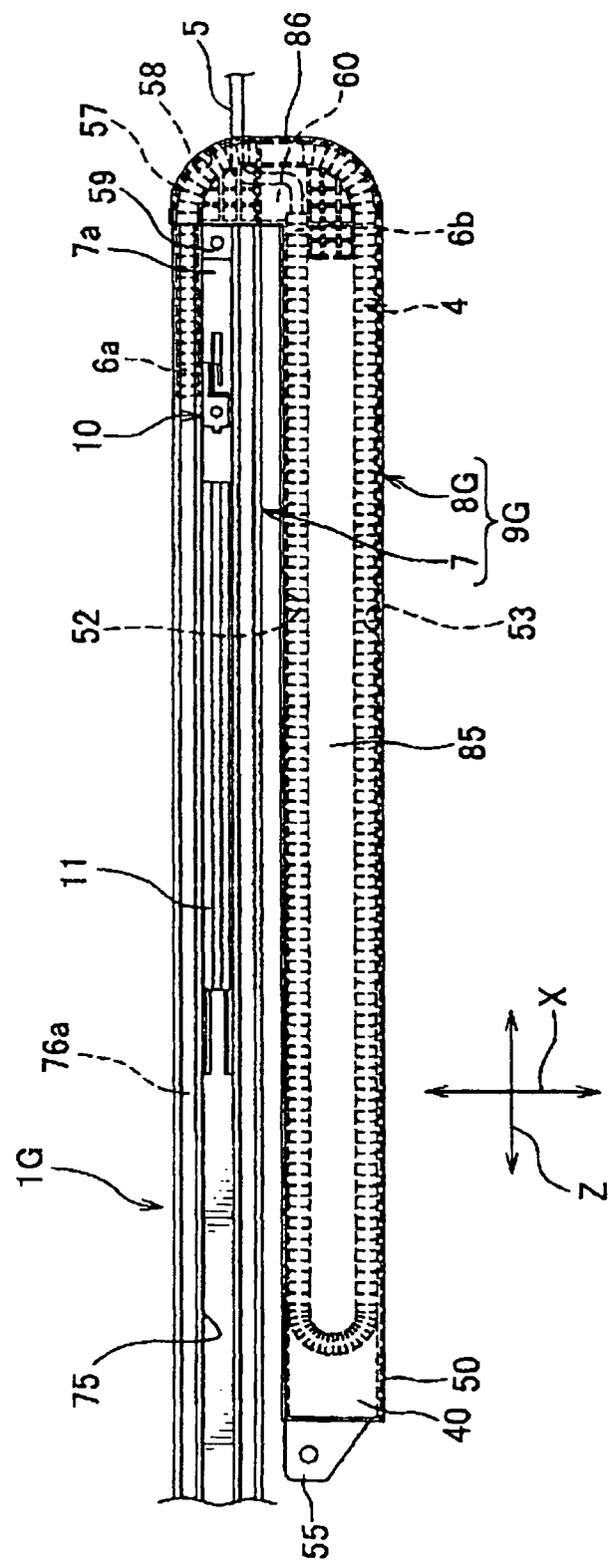
FIG. 13 is a plan view of a harness wiring apparatus of a sixth embodiment according to the present invention.

A harness wiring apparatus of a sixth embodiment according to the present invention will be described with reference to FIGS. 10-12. The same component as the 1st-5th embodiments is indicated with the same mark and the description is omitted.

Figure 1:
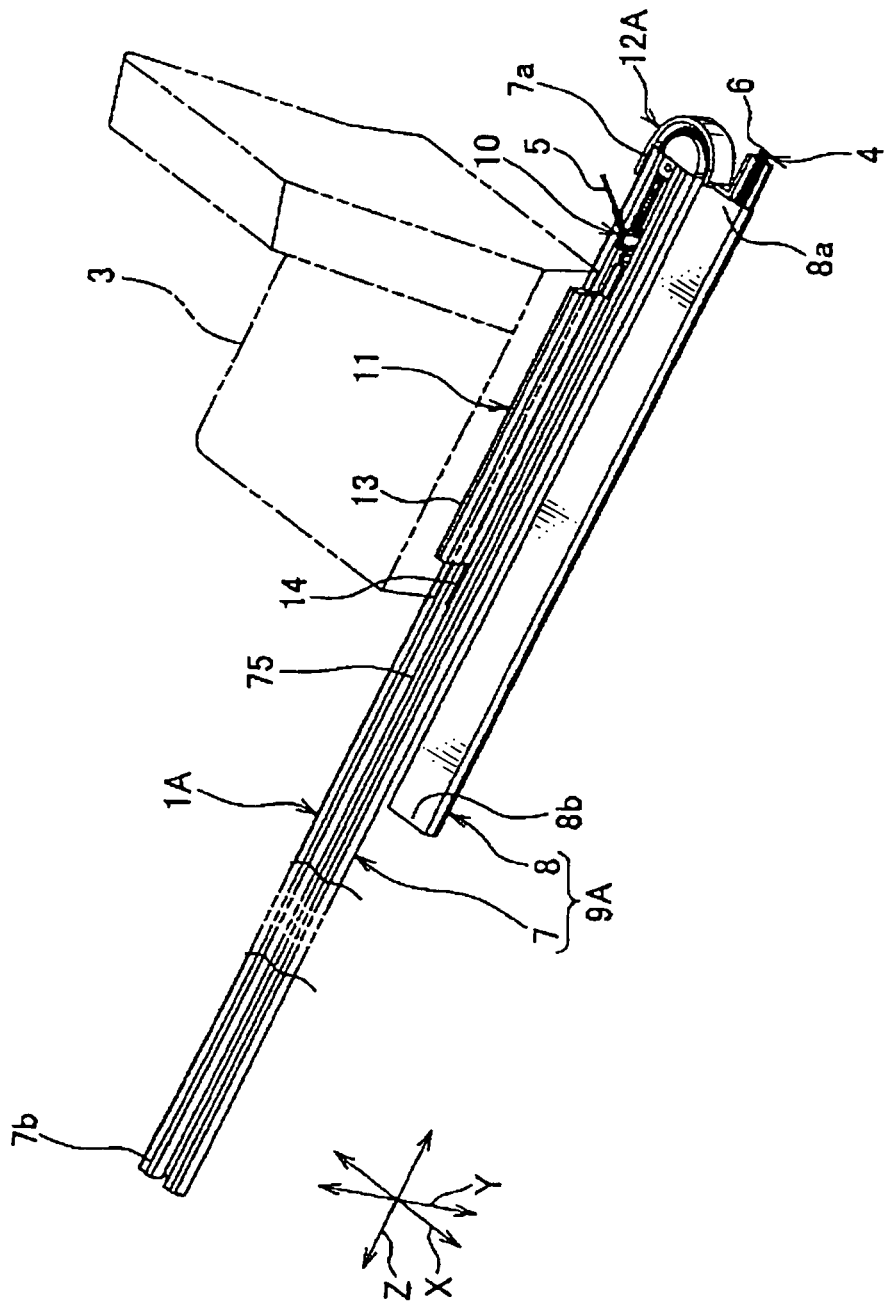
FIG. 1 is a perspective view of a harness wiring apparatus of a first embodiment according to the present invention.

The harness wiring apparatus 1F according to the embodiment includes two harnesses 4 arranged between the floor 2 and the seat 3 (FIG. 1). The harness wiring apparatus 1F includes a rail 9F having the support rail 7 and the receiving section 8 arranged in parallel to the support rail 7; the supporting body 11; the pair of malls 16 (not shown in FIGS. 10-12); a slider 10F as the holding member; a guide member 12F; and a guide piece 30.

The rail 9F has the same structure as that of the rail 9A described in the first embodiment.

The slider 10F having the structure of the slider 10 described in the first embodiment further includes a second harness mount portion 10d mounting the one end 6a of the corrugate tube 6, that is the harness 4, which is received slidably in the other room 76b from the pair of rooms 76a, 76b of the support rail 7, and pulled out through the one end 8a of the receiving section 8 and pulled through the opening of one end 7a of the support rail 7 into the room 76b of the support rail 7.

The guide member 12F is made of synthetic resin and includes a main body 20F formed into a half cylinder shape; a guide 21F recessed from a top surface of the main body 20F, and guiding the one harness 4, which is led from the one room 76a of the support rail 7 out of the support rail 7, by bending into a U-shape toward the one end 8a of the receiving section 8; a guiding 26F recessed from a top surface of the main body 20F, and guiding the other harness 4, which is led from the other room 76b of the support rail 7 out of the support rail 7, by bending into a U-shape toward the one end 8a of the receiving section 8; a first fixed portion 22F fixed at the one end 7a of the support rail 7; a second fixed portion 23F fixed at the one end 8a of the receiving section 8; and a lead guide 24F arranged along the harness 4, which is led from the one end 8a of the receiving section 8 to outside of the receiving section 8 and wired on the floor 2.

In the harness wiring apparatus 1F structured above, the two harnesses 4 are wired in parallel to each other between the floor 2 and the seat 3.

The guide piece 30 is arranged slidably in the receiving section 8. The guide piece 30 as shown in FIG. 10 includes a U-shaped groove 31, which the one harness 4 passes through, and a U-shaped outer wall, which the other harness 4 is arranged along. The guide piece 30 moves in the direction shown with the arrow Z in the receiving section 8 interlocking with the two harnesses 4. The guide piece 30 prevents that the one harness 4 and the other harness 4 abut on each other, so that the harnesses 4 can move in/out smoothly.

According to the present invention, when the harness 4 includes many wires, the harness wiring apparatus 1F can be structured compact and simple.

Seventh Embodiment

A harness wiring apparatus of a seventh embodiment according to the present invention will be described with reference to FIGS. 13-17. The same component as the 1st-6th embodiments is indicated with the same mark and the description is omitted.

The harness wiring apparatus 1G according to the embodiment includes a rail 9G having the support rail 7 and a receiving section 8G; the supporting body 11; the pair of malls 16 (not shown in FIGS. 13-17); the slider 10 as the holding member. The rail 9G includes the support rail 7 and the receiving section 8G as separated parts.

Figure 14:
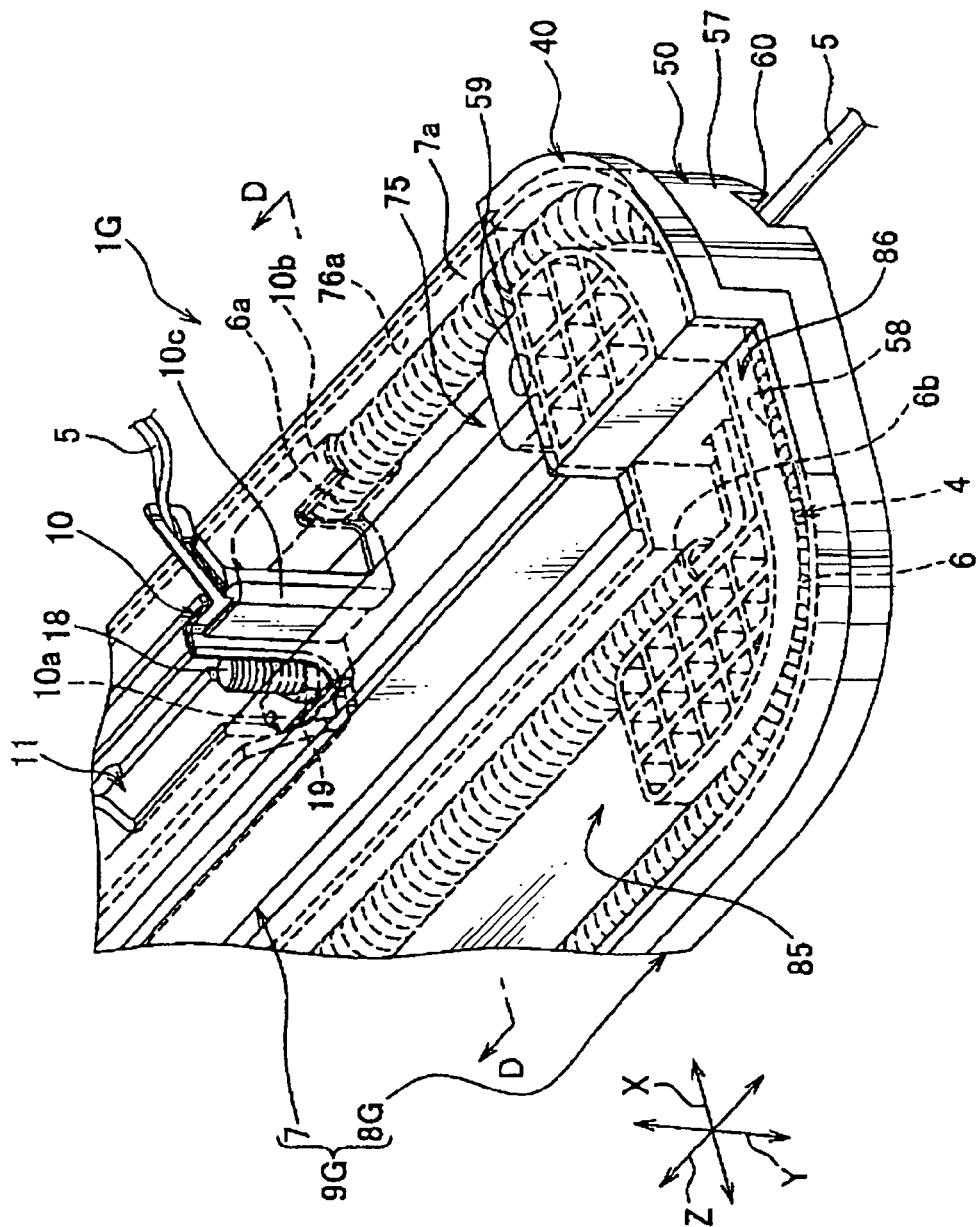
FIG. 14 is a partial expanded perspective view of the harness wiring apparatus shown in FIG. 13.

The receiving section 8G includes a rectangular-tube-shaped parallel portion 85 arranged in parallel to the support rail 7 so as to receive the extra-length of the harness 4, and a connecting portion 86 arranged continuously to one end of the parallel portion 85 so as to guide the extra-length of the harness 4, which is led from the opening of the one end 7a of the support rail 7 to the outside of the support rail 7, to the one end of the parallel portion 85, as shown in FIG. 14. The parallel portion 85 and the connecting portion 86 are formed integrally by synthetic resin.

Figure 15:
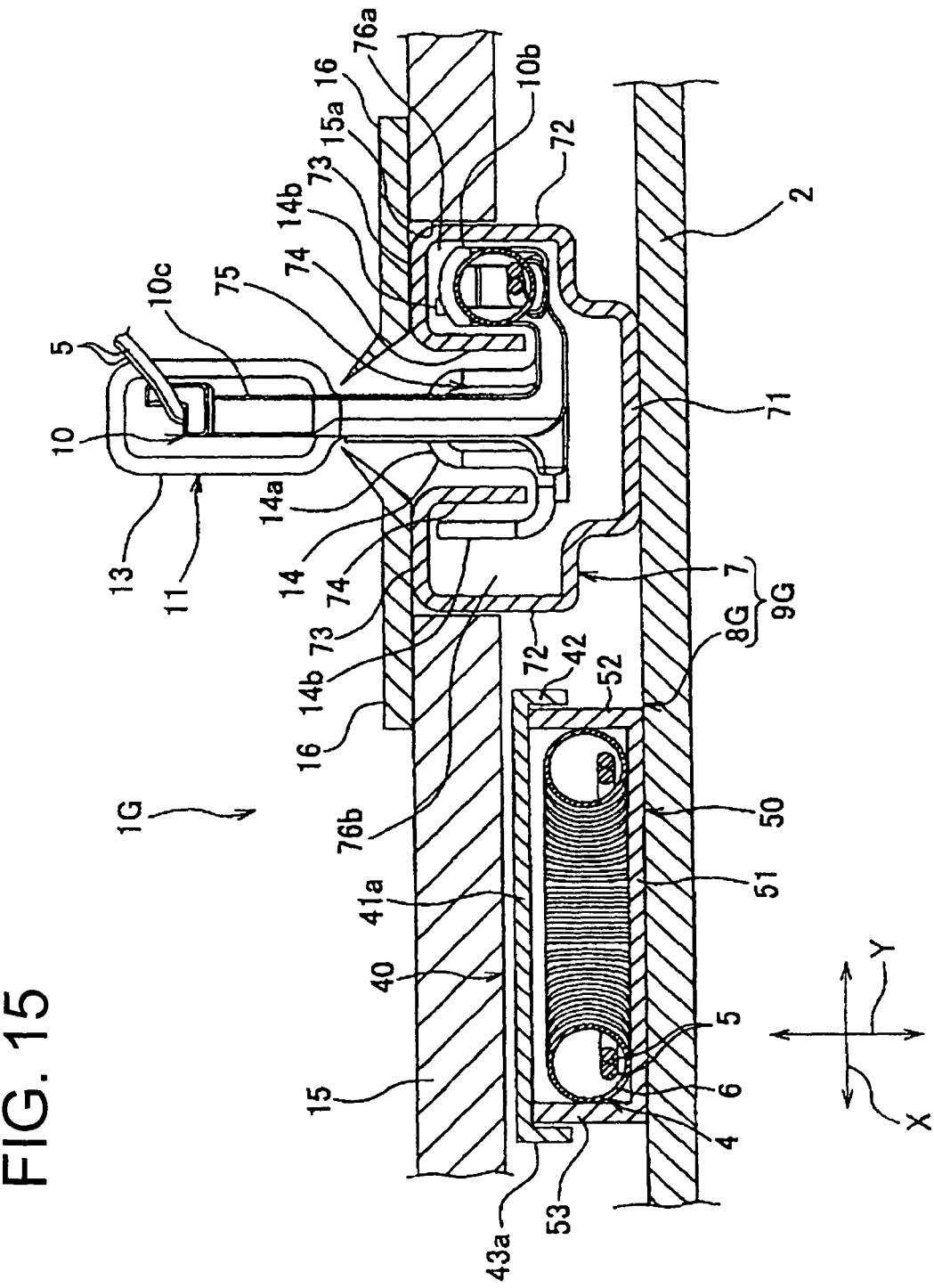
FIG. 15 is a cross-sectional view taken along the line D-D in FIG. 11.
Figure 16:
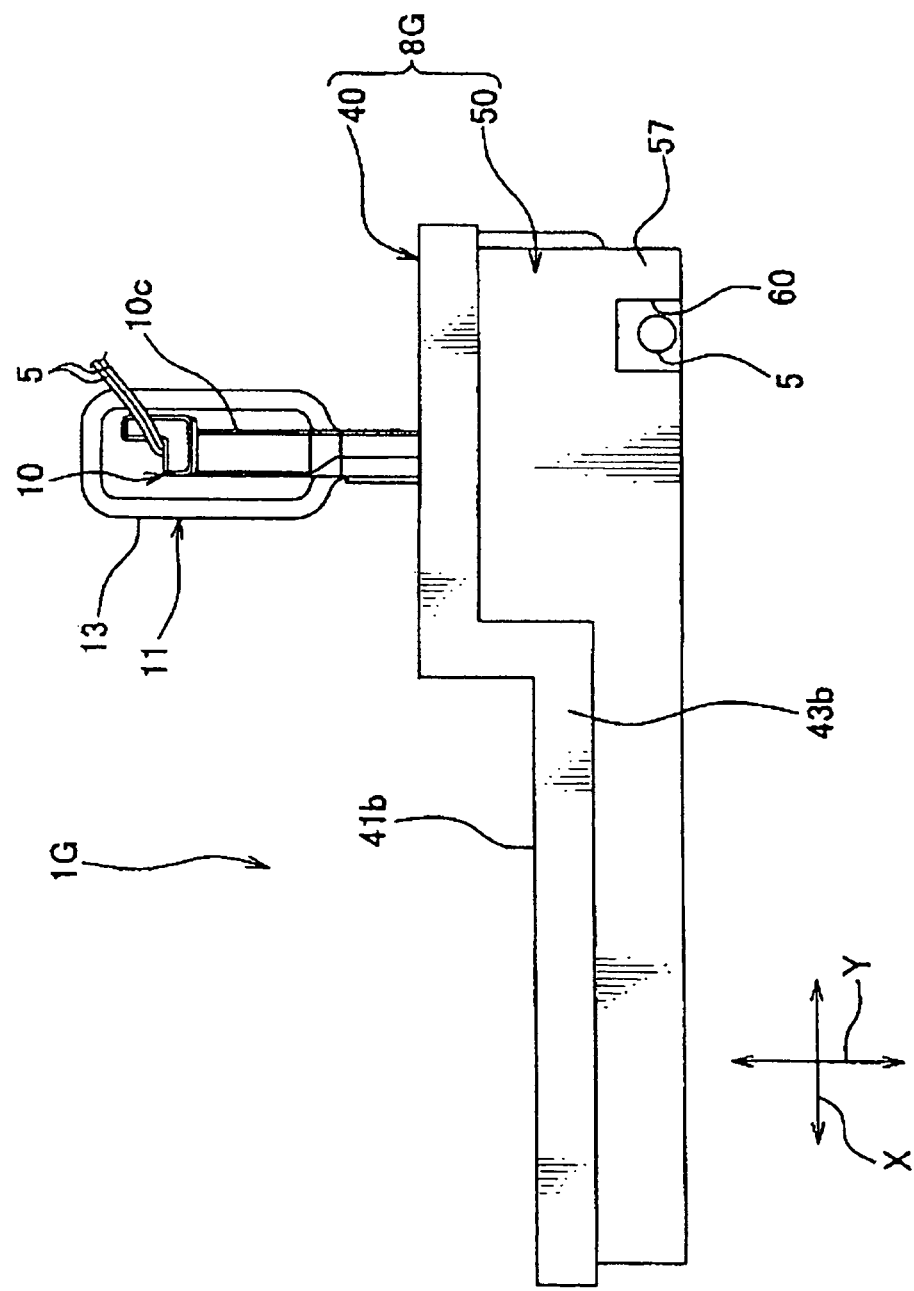
FIG. 16 is a side view of the harness wiring apparatus shown in FIG. 13.
Figure 17:
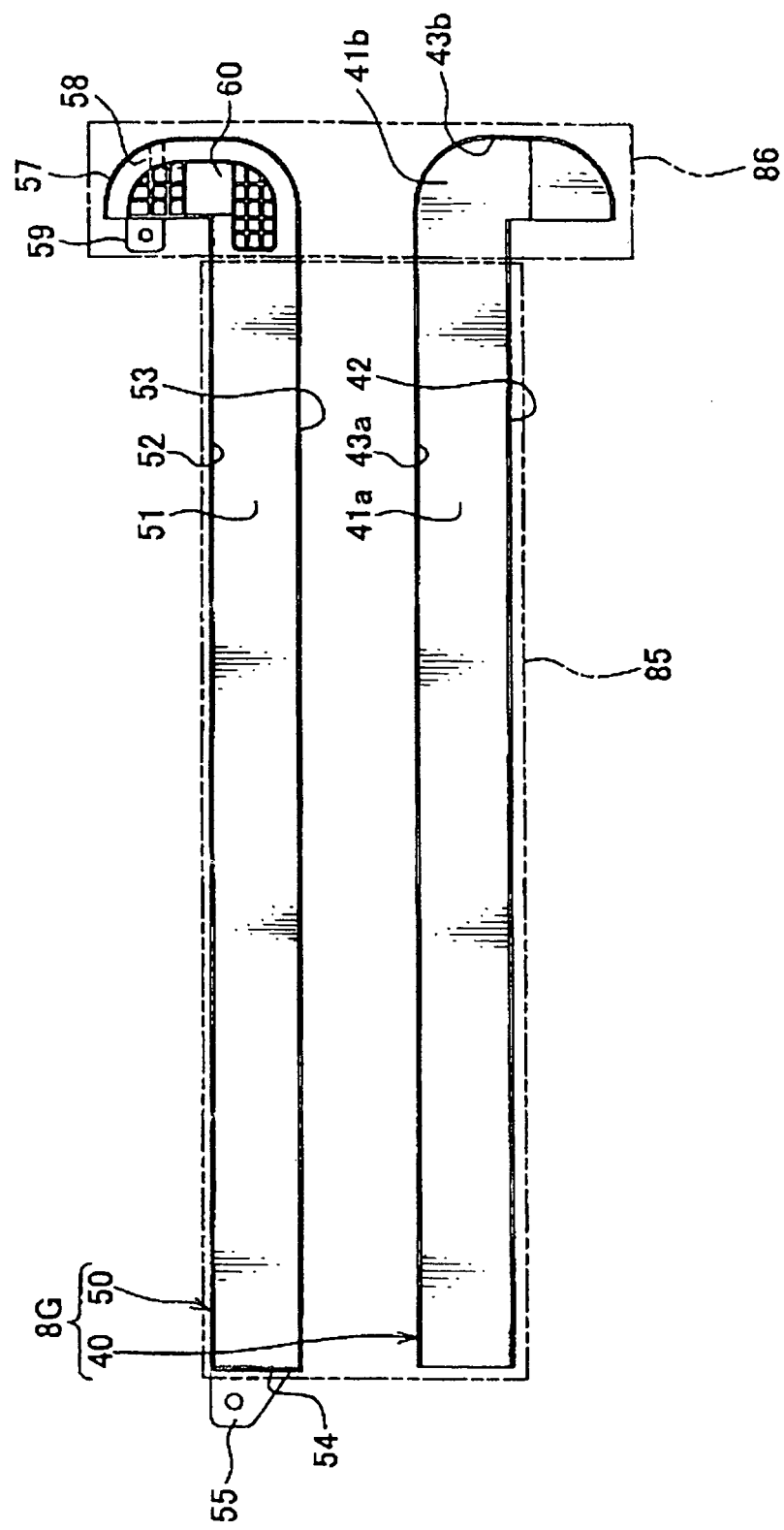
FIG. 17 is an illustration of a receiving section of the harness wiring apparatus shown in FIG. 13.
Figure 18:
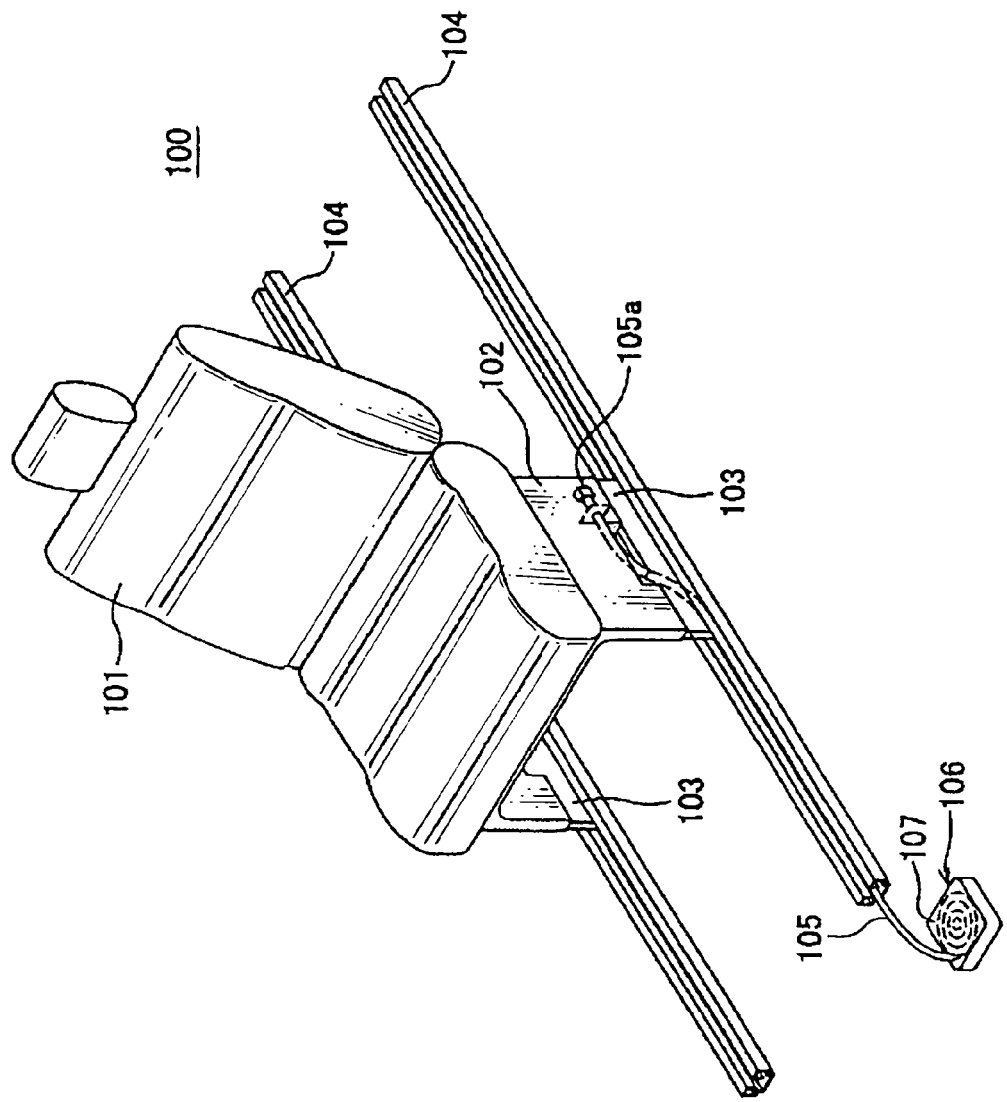
FIG. 18 is a perspective view of a harness wiring apparatus by prior art.
Figure 19A:
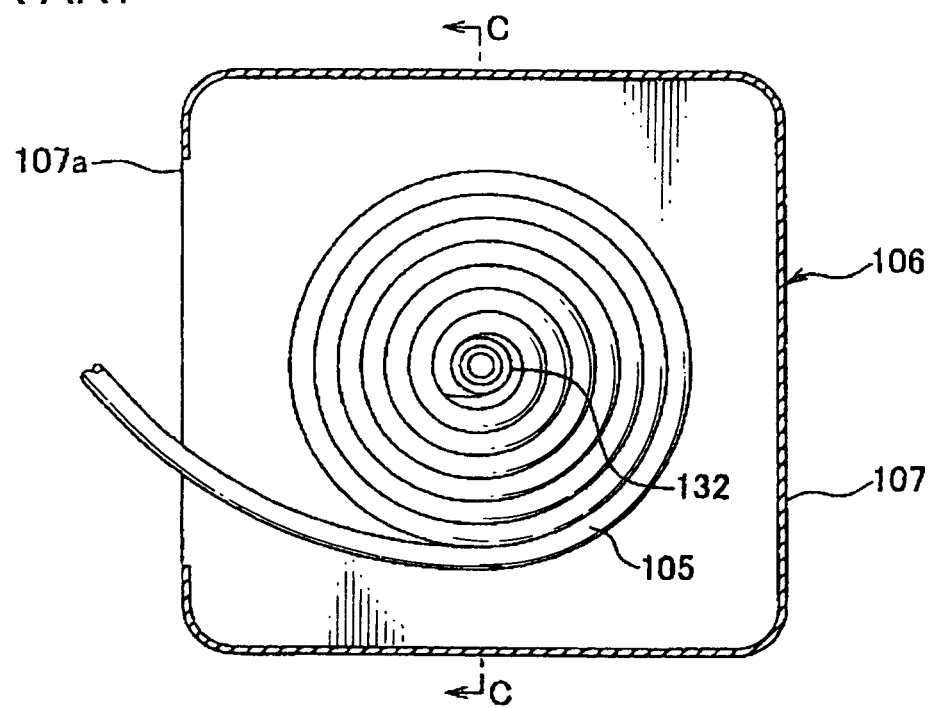
FIG. 19A is a cross-sectional view showing an inside of a housing of a winding device of the harness wiring apparatus shown in FIG. 18.
Figure 19B:
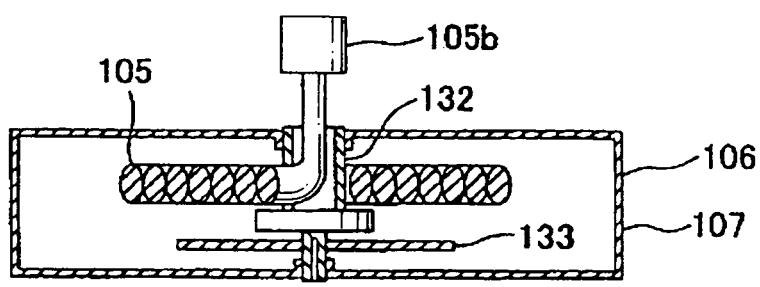
FIG. 19B is a cross-sectional view taken along the line C-C in FIG. 19A.

The receiving section 8G includes a rectangular parallelepiped shape receiving main body 50 and a body cover 40 covering a top of the receiving main body 50, as shown in FIGS. 15-17.

The receiving main body 50 integrally includes a bottom wall 51 attached on the floor 2; a pair of side walls 52, 53 extending vertically from each of both ends in a direction of widthwise of the bottom wall 51; a main body 57 formed into a half cylindrical shape continuously to each one end of the bottom wall 51, side walls 52, 53; a guide 58 recessed from a top surface of the main body 57, and guiding the harness 4, which is led from the opening of the one end 7a of the support rail 7, by bending the harness 4 into U-shape toward one end of the parallel portion 85, that is into a space between the side walls 52, 53 so as to touch the harness 4 on an inner surface of the side wall 53 farther from the support rail 7; a fix member 59 fixed at the one end 7a of the support trail 7 and projecting from an outer surface of the main body 57; a second guide 60 leading the harness 4, which is guided by the guide 58 and pulled in the parallel portion 85 (the space between side walls 52, 53) and folded into U-shape in the parallel portion 85, to be crossed over the guide 58 toward an outside of the receiving section 8G; a side wall 54 connecting each other end of the pair of side walls 52, 53; a mount piece 55 arranged at an outer surface of the side wall 54 to be mounted on the floor 2. Thus, the receiving main body 50 structure most of the receiving section 8G includes the bottom wall 51 and the side walls 52, 53, 54 structuring the parallel portion 85; and the main body 57, the guide 58, the second guide 60 structuring the connecting portion 86, integrally by synthetic resin.

The harness 4, which is guided by the guide 58 and pulled in the one end of the parallel portion 85, is folded into U-shape in the parallel portion 85 and the folded portion of the harness 4 touches to the inner surface of the side wall 52 closer to the support rail 7 by the elastic restoring force of the corrugate tube 6. Thus, the harness 4 is expanded in the parallel portion 85 by the elastic restoring force generated by the corrugate tube 6 so as to touch the inner surfaces of the side walls 52, 53.

The second guide 60 leads the wires 5, which is pulled out from the other end 6b of the corrugate tube 6 arranged at the one end of the parallel portion 85, toward the outside of receiving section 8G.

The body cover 40 includes integrally a top wall 41a facing the bottom wall 51 when it is mounted at the receiving main body 50; a pair of side walls 42, 43a extending vertically from each of both ends along widthwise of the top wall 41a; a second top wall 41b continued to the top wall 41a and covering a top of the main body 57; a side wall 43b continued to one end of the side wall 43a and extending vertically from one end of the second top wall 41b. In other words, the body cover 40 is formed by synthetic resin integrally with the top wall 41a, side walls 42, 43a, which structure the parallel portion 85, and the second top wall 41b and the side wall 43b, which structure the connecting portion 86.

As shown in FIG. 17, the bottom wall 51, the side walls 52, 53, 54, the top wall 41a, and side walls 42, 43a structure the parallel portion 85. The main body 57, the guide 58, the second guide 60, the second top wall 41b and the side wall 43b structure the connecting portion 86.

The parallel portion 85 performs the same function as the receiving section 8 described in the second embodiment, and the connecting portion performs the same function as the guide member 12B described in the second embodiment. Thus, the harness wiring apparatus 1G according to this embodiment has the almost same function as the harness wiring apparatus 1B described in the second embodiment. However, since the parallel portion 85 and the connecting portion 86 can be integrally formed with the same synthetic resin by injection molding, the number of components can be reduced and number of assembling process steps can be reduced.

The body cover 40 can be connected with the main body 50 by a thin hinge, and can be formed integrally with synthetic resin. The receiving section 8G may have at least the receiving section 50, and need not have the body cover 40.

A slack absorbing means can be provided to absorb slack of the harness 4 by pushing the harness 4 received in the receiving section 8, 8G.

According to the above embodiments, the support rail 7 and the receiving section 8, 8G are arranged separately. However, the support rail 7 and the receiving section 8, 8G can be provided integrally.

In the above embodiments, the slider 10, 10F, which is mounted at the supporting body 11 so as to be slidably against the support rail 7, is provided as the holding member. According to the present invention, the holding member can be fixed at the seat 3. The holding member also can be a part of the supporting body 11 or the seat 3.

While, in the embodiments, the present invention is described, it is not limited thereto. Various change and modifications can be made with the scope of the present invention.

The invention claimed is:

1. A harness wiring apparatus wiring a harness between a car body and a slide body, comprising:
    a long-tube-shaped support rail, fixed at the car body and provided with an opening at one end in a lengthwise direction thereof and a slit from the one end to the other end in the direction thereof;
    a supporting body supporting the slide body; and arranged slidably at the support rail;
    a holding member holding the harness and sliding interlockingly with the slide body and the supporting body, wherein one end of the harness is led from the opening of the support rail into the support rail and further led from the support rail into the holding member to be terminated at the slide body;
    an elongated receiving section receiving an extra-length of the harness,
        wherein the receiving section is arranged along a widthwise direction of the support rail and in parallel to the support rail; and
    a guide member disposed in a state being fixed to one end of the support rail between the opening of the support rail and the receiving section, and configured to guide the extra-length of the harness, the one end of the harness being made linearly moveable along the support rail in a state held by the holding member,
    wherein the extra-length of the harness is bent into U-shape in conformity with a shape of the guiding member and is received in the receiving section which is bent into another U-shape with the extra-length of the harness led in a direction parallel to the harness disposed in the support rail, and
    wherein a pair of spaces are provided at both sides of the slit in the support rail, and the harness is received in at least one of the pair of spaces.

2. The harness wiring apparatus according to claim 1, wherein the receiving section is provided as a different part from the support rail.

3. The harness wiring apparatus according to claim 1, wherein the holding member includes a plurality of harness hold members holding the harness, and a plurality of harnesses is arranged in parallel to each other therein.

4. The harness wiring apparatus according to claim 1, wherein a slider mounted at the supporting body and arranged slidably at the support rail is provided as the holding member.

5. The harness wiring apparatus according to claim 1, wherein the support rail and the receiving section are separately formed, and spaced apart from each other.

6. The harness wiring apparatus according to claim 1, wherein the receiving section comprises:
    a parallel portion arranged in parallel to the support rail so as to receive the extra-length of the harness, which is led through the opening of the support rail toward the outside of the support rail; and
    a connecting portion arranged continuously to the parallel portion so as to guide the extra-length of the harness, which is led through the opening of the support rail toward the outside of the support rail, to the parallel portion,
    wherein the parallel portion and the connecting portion are made integrally of synthetic resin.

* * * * *